(12) United States Patent
Holverson et al.

(10) Patent No.: US 12,145,223 B2
(45) Date of Patent: *Nov. 19, 2024

(54) METAL MANUFACTURING SYSTEMS AND METHODS USING MECHANICAL OSCILLATION

(71) Applicant: ILLINOIS TOOL WORKS, Glenview, IL (US)

(72) Inventors: Todd Earl Holverson, Appleton, WI (US); Christopher Hsu, Mentor, OH (US)

(73) Assignee: Illinois Tool Works Inc., Glenview, IL (US)

( * ) Notice: Subject to any disclaimer, the term of this patent is extended or adjusted under 35 U.S.C. 154(b) by 778 days.

This patent is subject to a terminal disclaimer.

(21) Appl. No.: 17/064,345

(22) Filed: Oct. 6, 2020

(65) Prior Publication Data
US 2021/0060589 A1 Mar. 4, 2021

Related U.S. Application Data

(63) Continuation of application No. 15/722,683, filed on Oct. 2, 2017, now Pat. No. 10,792,682.

(51) Int. Cl.
*B23K 9/04* (2006.01)
*B05B 5/00* (2006.01)
(Continued)

(52) U.S. Cl.
CPC ............... *B23K 9/04* (2013.01); *B05B 5/001* (2013.01); *B05B 5/0255* (2013.01); *B05B 7/226* (2013.01);
(Continued)

(58) Field of Classification Search
CPC .......... B23K 9/04; B23K 9/095; B23K 9/091; B23K 9/173; B23K 9/295; B23K 9/32; B23K 2103/18; B33Y 10/00; B33Y 30/00
See application file for complete search history.

(56) References Cited

U.S. PATENT DOCUMENTS

| 2,191,471 A | 2/1940 | Hopkins |
| 3,141,085 A | 7/1964 | Manz |

(Continued)

FOREIGN PATENT DOCUMENTS

| CA | 2560290 | 11/2013 |
| CN | 1053760 | 8/1991 |

(Continued)

OTHER PUBLICATIONS

"Evaluation of the Tip Tig Welding System, a Semi-automatic Hot Wire GTAW Process, Compared to Manual GTAW: Final Report," National Shipbuilding Research Program, Newport News Shipbuilding, a Division of Hungtington Ingalls Industries, Aug. 13, 2013.

(Continued)

*Primary Examiner* — Nathaniel E Wiehe
*Assistant Examiner* — Dilnessa B Belay
(74) *Attorney, Agent, or Firm* — McAndrews, Held & Malloy, Ltd.

(57) ABSTRACT

An example system includes an additive manufacturing tool configured to receive a wire from a wire feeder, to receive current from a power source, and to supply the wire to a workpiece during an additive manufacturing process, and a mechanical oscillation system configured to mechanically oscillate a structural component toward and away from the workpiece, wherein the structural component is external to the wire feeder and the power source.

20 Claims, 8 Drawing Sheets

(51) Int. Cl.

| | | |
|---|---|---|
| *B05B 5/025* | (2006.01) | |
| *B05B 7/22* | (2006.01) | |
| *B05B 12/18* | (2018.01) | |
| *B22F 3/115* | (2006.01) | |
| *B22F 7/06* | (2006.01) | |
| *B22F 10/00* | (2021.01) | |
| *B22F 10/22* | (2021.01) | |
| *B22F 12/00* | (2021.01) | |
| *B22F 12/90* | (2021.01) | |
| *B23K 9/067* | (2006.01) | |
| *B23K 9/095* | (2006.01) | |
| *B23K 9/12* | (2006.01) | |
| *B23K 9/173* | (2006.01) | |
| *B23K 9/23* | (2006.01) | |
| *B23K 9/29* | (2006.01) | |
| *B23K 9/32* | (2006.01) | |
| *B23K 31/12* | (2006.01) | |
| *B33Y 10/00* | (2015.01) | |
| *B33Y 30/00* | (2015.01) | |
| *B22F 10/36* | (2021.01) | |
| *B22F 10/38* | (2021.01) | |
| *B22F 10/85* | (2021.01) | |
| *B22F 12/10* | (2021.01) | |
| *B22F 12/13* | (2021.01) | |
| *B22F 12/58* | (2021.01) | |
| *B23K 103/18* | (2006.01) | |
| *B23K 103/20* | (2006.01) | |
| *B23K 103/24* | (2006.01) | |

(52) U.S. Cl.
CPC .............. *B05B 12/18* (2018.02); *B22F 3/115* (2013.01); *B22F 7/064* (2013.01); *B22F 10/00* (2021.01); *B22F 10/22* (2021.01); *B22F 12/222* (2021.01); *B22F 12/90* (2021.01); *B23K 9/067* (2013.01); *B23K 9/095* (2013.01); *B23K 9/122* (2013.01); *B23K 9/173* (2013.01); *B23K 9/232* (2013.01); *B23K 9/295* (2013.01); *B23K 9/32* (2013.01); *B23K 31/12* (2013.01); *B33Y 10/00* (2014.12); *B33Y 30/00* (2014.12); *B22F 10/36* (2021.01); *B22F 10/38* (2021.01); *B22F 10/85* (2021.01); *B22F 12/10* (2021.01); *B22F 12/13* (2021.01); *B22F 12/58* (2021.01); *B23K 2103/18* (2018.08); *B23K 2103/20* (2018.08); *B23K 2103/24* (2018.08)

(56) References Cited

U.S. PATENT DOCUMENTS

| | | | |
|---|---|---|---|
| 3,581,053 A * | 5/1971 | Manz | B23K 9/091 |
| | | | 219/137.8 |
| 3,912,980 A | 10/1975 | Crump | |
| 4,361,137 A | 11/1982 | Grosholz | |
| 4,365,137 A | 12/1982 | Tarasov | |
| 4,595,820 A | 6/1986 | Richardson | |
| 4,665,299 A | 5/1987 | Iwata | |
| 4,723,060 A | 2/1988 | Arnoldy | |
| 4,758,707 A | 7/1988 | Ogilvie | |
| 4,889,969 A | 12/1989 | Kawai | |
| 4,897,523 A | 1/1990 | Parks | |
| 5,148,001 A | 9/1992 | Stava | |
| 5,281,789 A | 1/1994 | Merz | |
| 5,542,049 A | 7/1996 | Kurokawa | |
| 5,697,901 A | 12/1997 | Eriksson | |
| 6,023,046 A | 2/2000 | Holverson et al. | |
| 6,051,810 A | 4/2000 | Stava | |
| 6,248,976 B1 | 6/2001 | Blankenship | |
| 6,265,701 B1 | 7/2001 | Bickel | |
| 6,326,591 B1 | 12/2001 | Hutchinson | |
| 6,329,636 B1 | 12/2001 | Geissler | |
| 6,331,694 B1 | 12/2001 | Blankenship | |
| 6,405,095 B1 | 6/2002 | Jang | |
| 6,441,342 B1 | 8/2002 | Hsu | |
| 6,498,321 B1 | 12/2002 | Fulmer | |
| 6,515,259 B1 | 2/2003 | Hsu | |
| 6,534,745 B1 | 3/2003 | Lowney | |
| 6,707,001 B1 | 3/2004 | Ulrich | |
| 6,800,832 B2 | 10/2004 | Hutchison | |
| 6,909,067 B2 | 6/2005 | Davidson | |
| 6,933,466 B2 | 8/2005 | Hutchison | |
| 6,963,048 B2 | 11/2005 | Huismann | |
| 6,969,823 B2 | 11/2005 | Huismann | |
| 6,974,931 B2 | 12/2005 | Holverson | |
| 7,129,443 B2 | 10/2006 | Davidson | |
| 7,165,707 B2 * | 1/2007 | Huismann | B23K 9/073 |
| | | | 226/188 |
| 7,304,269 B2 | 12/2007 | Fulmer | |
| 7,335,854 B2 | 2/2008 | Hutchison | |
| 8,373,094 B2 | 2/2013 | Wells | |
| 8,522,647 B1 | 9/2013 | Dixon | |
| 8,598,492 B2 | 12/2013 | Davidson | |
| 8,704,131 B2 | 4/2014 | Davidson | |
| 8,803,034 B2 | 8/2014 | Peters | |
| 8,901,453 B2 | 12/2014 | Miyagi | |
| 9,174,294 B2 | 11/2015 | Hutchison et al. | |
| 9,314,865 B2 | 4/2016 | Davidson | |
| 2001/0009252 A1 | 7/2001 | Hiraoka | |
| 2001/0040153 A1 | 11/2001 | Lanouette | |
| 2002/0092376 A1 | 7/2002 | Nozawa | |
| 2003/0021251 A1 | 1/2003 | Moshiri-Tafreshi | |
| 2003/0058149 A1 | 3/2003 | Jayadeva | |
| 2003/0062355 A1 | 4/2003 | Ikegami | |
| 2003/0068518 A1 | 4/2003 | Ando | |
| 2003/0201251 A1 | 10/2003 | Barbezat | |
| 2004/0234687 A1 | 11/2004 | Schmid | |
| 2005/0284599 A1 | 12/2005 | Grinberg | |
| 2006/0054079 A1 | 3/2006 | Withey | |
| 2006/0226137 A1 | 10/2006 | Huismann | |
| 2007/0000893 A1 | 1/2007 | Huismann | |
| 2007/0051711 A1 | 3/2007 | Kachline | |
| 2007/0102407 A1 | 5/2007 | Uezono | |
| 2007/0181547 A1 | 8/2007 | Vogel | |
| 2008/0087359 A1 | 4/2008 | Zurecki | |
| 2008/0217314 A1 | 9/2008 | Wells | |
| 2008/0264917 A1 | 10/2008 | White | |
| 2009/0078689 A1 | 3/2009 | Brass | |
| 2009/0173726 A1 | 7/2009 | Davidson et al. | |
| 2009/0242533 A1 | 10/2009 | Yamazaki | |
| 2009/0304943 A1 | 12/2009 | Gollob | |
| 2010/0176104 A1 | 7/2010 | Peters | |
| 2011/0108527 A1 | 5/2011 | Peters | |
| 2011/0204034 A1 | 8/2011 | Schartner | |
| 2011/0220619 A1 | 9/2011 | Mehn | |
| 2011/0288575 A1 | 11/2011 | Colton | |
| 2012/0067859 A1 | 3/2012 | Albrecht | |
| 2012/0097655 A1 | 4/2012 | Daniel | |
| 2012/0143491 A1 | 6/2012 | Cheng | |
| 2012/0209307 A1 | 8/2012 | Snijders | |
| 2012/0298642 A1 | 11/2012 | Lambert | |
| 2012/0325779 A1 | 12/2012 | Yelistratov | |
| 2013/0153557 A1 | 6/2013 | Pagano | |
| 2013/0309420 A1 | 11/2013 | Flesch | |
| 2014/0021183 A1 | 1/2014 | Peters | |
| 2014/0117000 A1 * | 5/2014 | Hutchison | B23K 9/1062 |
| | | | 219/130.33 |
| 2014/0251971 A1 | 9/2014 | Hearn | |
| 2014/0263237 A1 | 9/2014 | Daniel | |
| 2014/0263241 A1 | 9/2014 | Henry | |
| 2015/0021379 A1 | 1/2015 | Albrecht | |
| 2015/0021815 A1 * | 1/2015 | Albrecht | B29C 64/393 |
| | | | 425/162 |
| 2015/0076119 A1 | 3/2015 | Hsu | |
| 2015/0105898 A1 | 4/2015 | Adams | |
| 2016/0059342 A1 | 3/2016 | Plasch | |
| 2016/0267806 A1 | 9/2016 | Hsu et al. | |
| 2016/0288235 A1 | 10/2016 | Davidson | |
| 2017/0050254 A1 | 2/2017 | Holverson | |
| 2017/0072499 A1 | 3/2017 | Schartner | |

(56) References Cited

U.S. PATENT DOCUMENTS

FOREIGN PATENT DOCUMENTS

| | | |
|---|---|---|
| CN | 2125475 | 12/1992 |
| CN | 1593829 | 3/2005 |
| CN | 1597193 | 3/2005 |
| CN | 101185986 | 5/2008 |
| CN | 101491856 | 7/2009 |
| CN | 201644997 | 11/2010 |
| CN | 102791414 | 11/2012 |
| CN | 103056367 | 4/2013 |
| CN | 104043830 | 9/2014 |
| CN | 104760290 | 7/2015 |
| DE | 102013217317 | 3/2015 |
| EP | 1080818 | 3/2001 |
| EP | 2644306 | 10/2013 |
| EP | 2781291 | 10/2015 |
| EP | 2929972 | 10/2015 |
| EP | 3132877 | 2/2017 |
| EP | 3165314 | 5/2017 |
| JP | H04127970 | 4/1992 |
| JP | H07252630 | 10/1995 |
| JP | 2001138059 | 5/2001 |
| JP | 2003010970 | 1/2003 |
| WO | 2012121086 | 9/2012 |
| WO | 2013056280 | 4/2013 |
| WO | 2017077132 | 5/2017 |

OTHER PUBLICATIONS

"Tattoo Machine", http://en.wikipedia.org/wiki/Tattoo_machine [accessed Apr. 7, 2017].

"The Total Benefits from Tip Tig," The Evolution of TIG brochure, Tip Tig USA [last accessed Aug. 10, 2017].

"Tip Tig Your, Welding Solution," Tip Tig International AG (Switzerland) Sales and Business Development [last accessed Aug. 10, 2017].

Int'l Search Report and Written Opinion Appln No. PCT/US2018/053760 mailed Mar. 7, 2019 (13 pgs.).

Int'l Search Report from PCT Appln. No. PCT/US2014/046568, dated Dec. 5, 2014, 12 pgs.

Int'l Search Report from PCT Appln No. PCT/US2014/046769, dated Dec. 5, 2014, 11 pgs.

Int'l Search Report from PCT Appln No. PCT/US2016/061381, dated Jan. 24, 2017.

Kapustka, Nick, "Achieving Higher Productivity Rates Using Reciprocating Wire Feed Gas Metal Arc Welding," Welding Journal, Apr. 2015, pp. 70-74.

Painful Pleasures, Help Center, "Coil vs. Rotary Tattoo Machines", http://info.painfulpleasures.com/help-center/information-center/coil-vs-rotary-tattoo-machines [accessed Apr. 7, 2017].

* cited by examiner

METAL MANUFACTURING SYSTEMS AND METHODS USING MECHANICAL OSCILLATION

BACKGROUND

The present disclosure relates generally to metal manufacturing systems and methods and, more particularly, to systems and methods for joining or building metal workpieces using mechanical oscillation of an electrode.

Various manufactured products may incorporate components with different materials. As may be appreciated, the different materials of the manufactured products may be joined together by fasteners, mating geometries, welding, or other processes. Fasteners or complementary geometries may add components or weight to the joint. Three dimensional welding and additive manufacturing with metals can be useful for creating durable components in a controlled and precise manner Unfortunately, such processes can be complicated and expensive.

BRIEF DESCRIPTION

In one embodiment, a system includes a welding tool configured to receive a welding wire from a wire feeder, to receive welding power from a power source, and to supply the welding wire to a workpiece during a welding process. The system also includes a mechanical oscillation system configured to mechanically oscillate a structural component toward and away from the workpiece. The structural component is external to the wire feeder and the power source.

In another embodiment, a system includes a welding tool configured to receive a welding wire from a wire feeder, to receive welding power from a power source, and to supply the welding wire to a workpiece during a welding process. The system also includes a mechanical oscillation system configured to mechanically oscillate a structural component toward and away from the workpiece. The structural component is external to the wire feeder and the power source. The system further comprises control circuitry configured to control the welding power based on feedback relating to the welding process.

In another embodiment, a system includes a welding tool configured to receive a welding wire and to supply the welding wire to a workpiece. The welding tool comprises a mechanical oscillation system configured to mechanically oscillate a structural component of the welding tool toward and away from the workpiece. The system also includes control circuitry configured to receive an arc start command, to control the mechanical oscillation system to start oscillation of the structural component, to control a wire feeder to begin feeding the welding wire, to determine whether an arc between the welding wire and the workpiece is initiated based at least in part on feedback received from a sensor, to control the mechanical oscillation system to stop oscillation of the structural component once the arc is determined to be established, and to control the wire feeder to increase a wire feed speed of the welding wire to a desired wire feed speed.

DRAWINGS

These and other features, aspects, and advantages of the present disclosure will become better understood when the following detailed description is read with reference to the accompanying drawings in which like characters represent like parts throughout the drawings, wherein.

Figure 10:
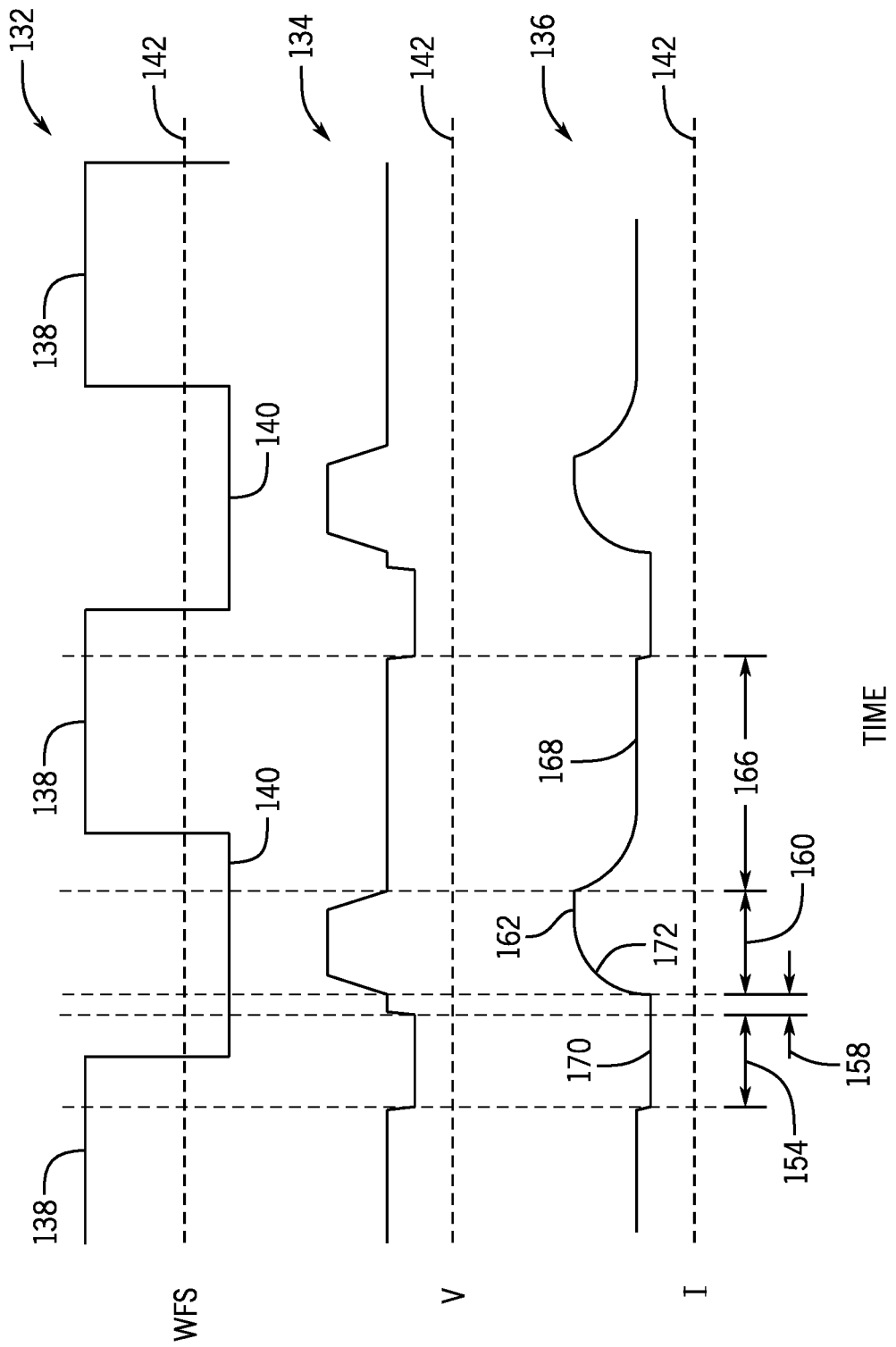
Figure 11:
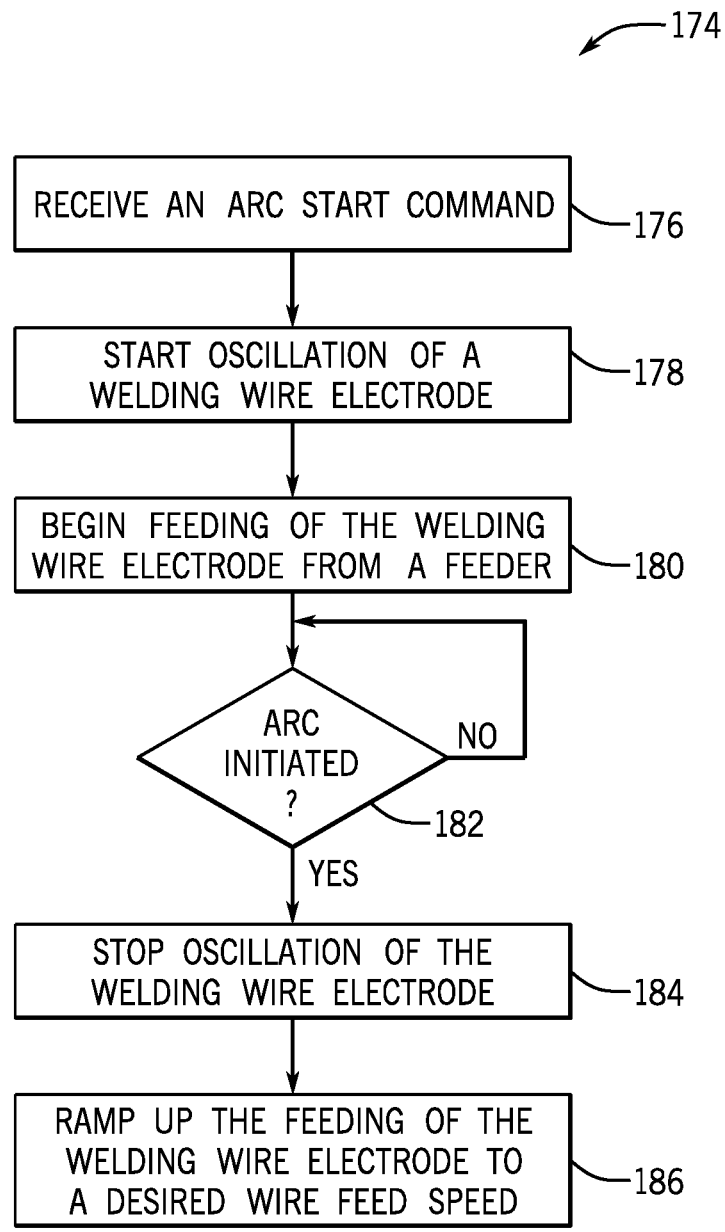

FIG. 10 illustrates another set of time series of wire feed speed of the welding wire electrode caused by the mechanical oscillation system, voltage of electrical power generated by the power source, and current of the electrical power generated by the power source, in accordance with another exemplary CSC wave shape implemented by the controller; and FIG. 11 is a flow chart that depicts an arc starting process that may be implemented by the system.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
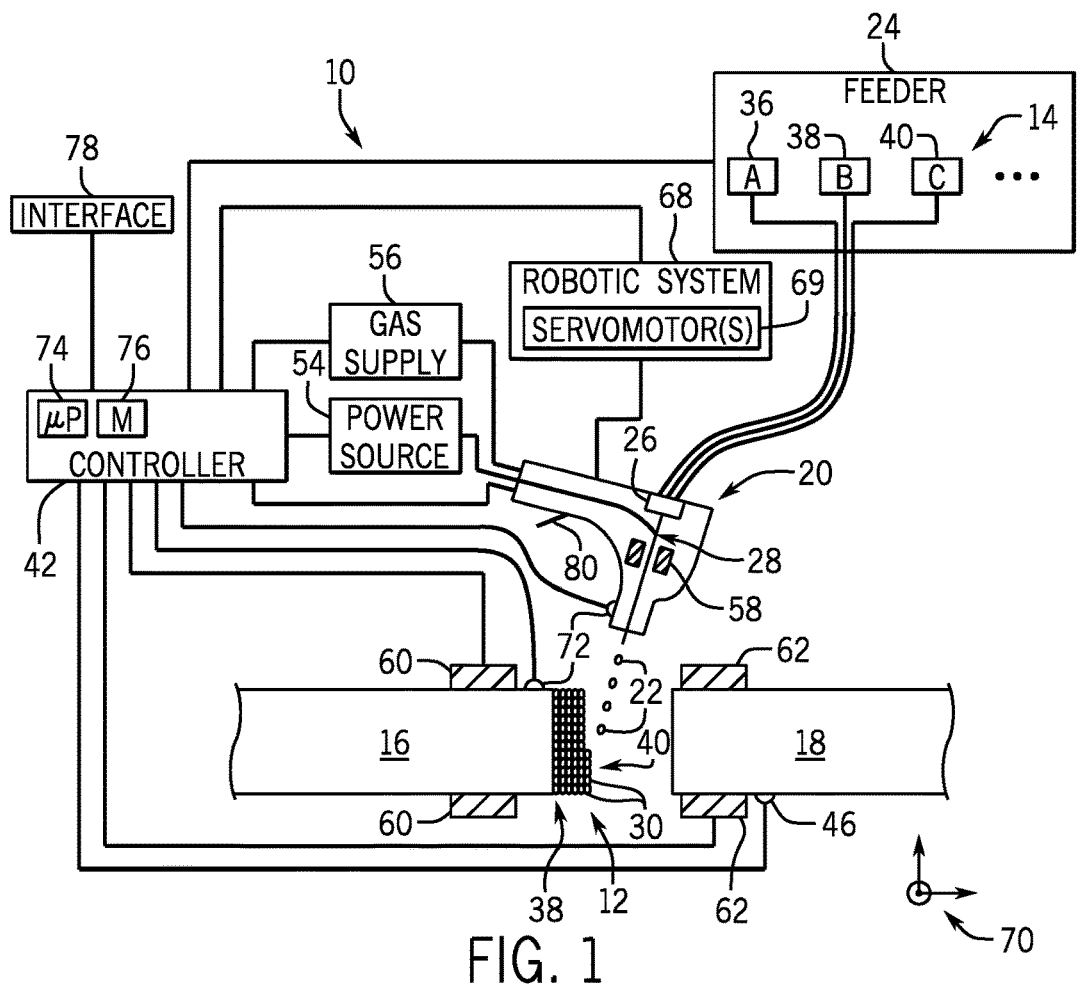
FIG. 1 is a diagram of an embodiment of a manufacturing system and a part.

Turning to FIG. 1, an embodiment of a system 10 (e.g., an additive manufacturing system or a welding system) that additively forms (e.g., prints, builds) a part 12 from one or more anchoring materials 14. The formed part 12 may be a first workpiece 16, a second workpiece 18, or a joint between the first workpiece 16 and the second workpiece 18, or any combination thereof. In some embodiments, the first and second workpieces 16, 18 may be of different materials having significantly different physical properties. For example, in one embodiment, the first workpiece 16 may be aluminum and the second workpiece 18 may be steel. It is noted that FIGS. 1-3 primarily focus on embodiments where the system 10 is an additive manufacturing system configured to join the workpieces 16, 18 to form the part 12, or to build the part 12 up from one of the workpieces 16, 18, using multiple droplets 22 deposited onto the workpieces 16, 18. However, as described in greater detail herein, in other embodiments, the system 10 may be a welding system configured to join the workpieces 16, 18 by creating a welding arc between an electrode 28 and the workpieces 16, 18 to form a weld between the workpieces 16, 18.

In the embodiment illustrated in FIG. 1, a manufacturing tool 20 deposits multiple droplets 22 to form (e.g., print, build) the part 12 of the one or more anchoring materials 14. In some embodiments, the manufacturing tool 20 deposits the droplets 22 between the first and second workpieces 16, 18. As described in detail below, the manufacturing tool 20 may utilize one or more types of energy to form and deposit the droplets 22 to form the part 12. The one or more types of energy utilized by the manufacturing tool 20 may include, but are not limited to, an electric power output, photonic energy (e.g., laser), or any combination thereof. Where the part 12 is a joint between the first and second workpieces 16, 18, the manufacturing tool 20 utilizes the energy to join the first and second workpieces 16, 18 via the part 12.

The manufacturing tool 20 heats the one or more anchor materials 14 from a feeder 24 to form the droplets 22 having a desired composition. In some embodiments, a mixer 26 of the manufacturing tool 20 is configured to receive and to combine the one or more anchor materials 14 from the feeder 24. For example, the mixer 26 may combine the multiple anchor materials 14 into an electrode 28 having a desired combination of the anchor materials 14. In some embodiments, the mixer 26 may form a powder mixture of the multiple anchor materials 14. The electrode 28 and/or the powder mixture may be formed into droplets 22. The one or more anchor materials 14 are metallic materials that include, but are not limited, to aluminum alloys, steel alloys, aluminum, iron, copper, manganese, silicon, magnesium, zinc, chromium, titanium, molybdenum, and nickel. As discussed herein, the droplets 22 are units of material transfer. Each droplet 22 may become a "micro-deposit" when solidified, and the part 12 is formed from multiple micro-deposits 30.

Figure 2:
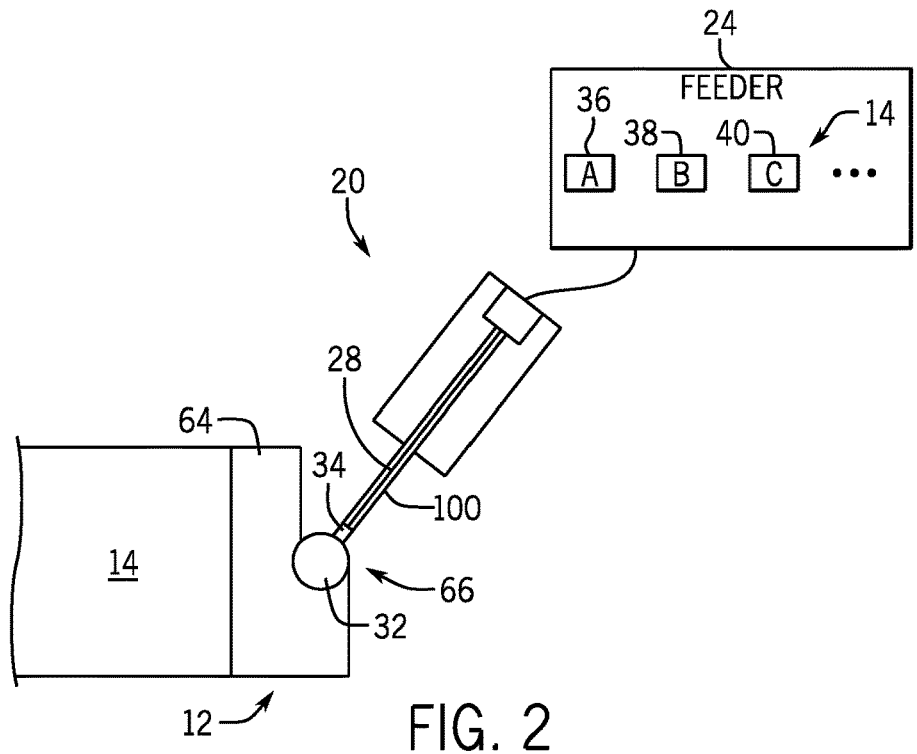
FIG. 2 is a diagram of an embodiment of the manufacturing system and a part.

FIG. 2 illustrates an embodiment of the manufacturing tool 20 that directs the anchor material 14 (e.g., electrode 28) into a molten puddle 32 of micro-deposits 30 to form the part 12. The anchor material 14 may be at approximately ambient temperature or a preheated temperature when inserted into the puddle 32. A portion 34 (e.g., ball) of the anchor material 14 is melted by the puddle 32, thereby forming a micro-deposit 30 of the part 12 without forming a defined droplet 22. For example, in certain embodiments, the preheated portion 34 of the anchor material 14 may join the puddle 32, thereby forming the micro-deposit 30 of the part 12 via a hotwire welding process. As may be appreciated, the puddle 32 may be a recently formed section of the part 12 that has not yet solidified. The energy applied to the puddle 32 that melts the portion 34 may include, but is not limited, to resistance heating, photonic (laser) energy, plasma, or inductive heating.

Returning to FIG. 1, the one or more anchor materials 14 may include, but are not limited to, powders, solid wires, cored wires, tubular wires, or coated wires, or any combination thereof. In some embodiments, a first anchor material 36 may be substantially the material of the first workpiece 16, and a second anchor material 38 may be substantially the material of the second workpiece 18. In other words, the first and second anchor materials 36, 38 may have chemical compositions that are substantially similar or compatible to the respective first and second workpieces 16, 18. For example, the first anchor material 36 may have only minor differences (e.g., elemental components varying by only fractions of compositional percentages, different alloys from the same alloy family) relative to the material of the first workpiece 16. In some embodiments, anchoring materials 14 may include, but are not limited to, brazing or soldering materials with lower melting temperatures than the materials of the first workpiece 16 and/or the second workpiece 18. Anchor materials 14 with a lower melting temperature than the first or second workpieces 16, 18 may enable layers of micro-deposits 30 adjacent to the first or second materials 16, 18 to not melt when the one or more anchoring materials 14 is applied. Some embodiments of the system 10 may include more than two anchoring materials 14, such as 3, 4, 5, 6, 7, 8, 9, 10, or more anchoring materials 14. For example, a third anchor material 40 may be supplied to the manufacturing tool 20. The third anchor material 40 may have a chemical composition that is substantially similar to the material of the first workpiece 16 or to the material of the second workpiece 18. Additionally, or in the alternative, the third anchor material 40 may have a chemical composition that is an alloying material that provides a desired property (e.g., adhesion, increased or decreased fluidity) between the first and second anchoring materials 36, 38, and/or the chemical composition of the third anchor material 40 may provide a desired property (e.g., strength, hardness, galvanic protection) to the part 12.

A controller 42 of the system 10 controls the application of the droplets 22 to form the part (e.g., anchor) 12 from the micro-deposits 30. In certain embodiments, the controller 42 may be a single control system with a single controller, or the controller 42 may include multiple control systems or controllers. For example, multiple control systems of the controller 42 may be configured to regulate different components or systems of the system 10 and/or the multiple control systems may be responsive to a single, central controller of the controller 42. In some embodiments with wired anchor materials 14, the controller 42 controls the composition of the droplets 22 applied to the part 12 by adjusting the relative quantities of the one or more anchor materials 14 supplied to the mixer 26 of the manufacturing tool 20, which thereby forms the electrode 28. For example, where the first anchor material 36 is substantially similar to or compatible with the material of the first workpiece 16, the controller 42 may increase the relative ratio of the first anchor material 36 in the electrode 28 to form (e.g., print) portions of the part 12 near the first workpiece 16. As discussed herein, the composition of each droplet 22 is based on the one or more anchor materials 14 that make up the respective droplet 22. The droplets 22 are liquid (e.g., molten) at least in part. In some embodiments, a droplet 22 may be a liquid anchor material 14 encapsulating a solid element of the same or a different anchor material 14. For example, the manufacturing tool 20 may at least partially melt only an outer layer of a droplet 22.

In certain embodiments, the manufacturing tool 20 mixes (e.g., melts, sinters, compresses) multiple anchor materials 14 with the mixer 26 into an electrode 28 with a mixed composition. The controller 42 may control the manufacturing tool 20 to form droplets 22 with the mixed composition from the mixed electrode 28. The controller 42 may adjust the composition of the part (e.g., anchor) 12 by varying ratios of the one or more anchor materials 14 in the mixed electrode 28. In some embodiments, the manufacturing tool 20 supplies each of the one or more anchor materials 14 as a separate electrode 28 that the manufacturing tool 20 respectively forms into droplets 22. For example, the controller 42 may control the manufacturing tool 20 to form separate droplets 22 with different respective compositions from each of the multiple electrodes 28. The controller 42 may adjust the composition of the part 12 by varying ratios of the one or more anchor materials 14 applied as droplets 22 to the part 12.

Figure 3:
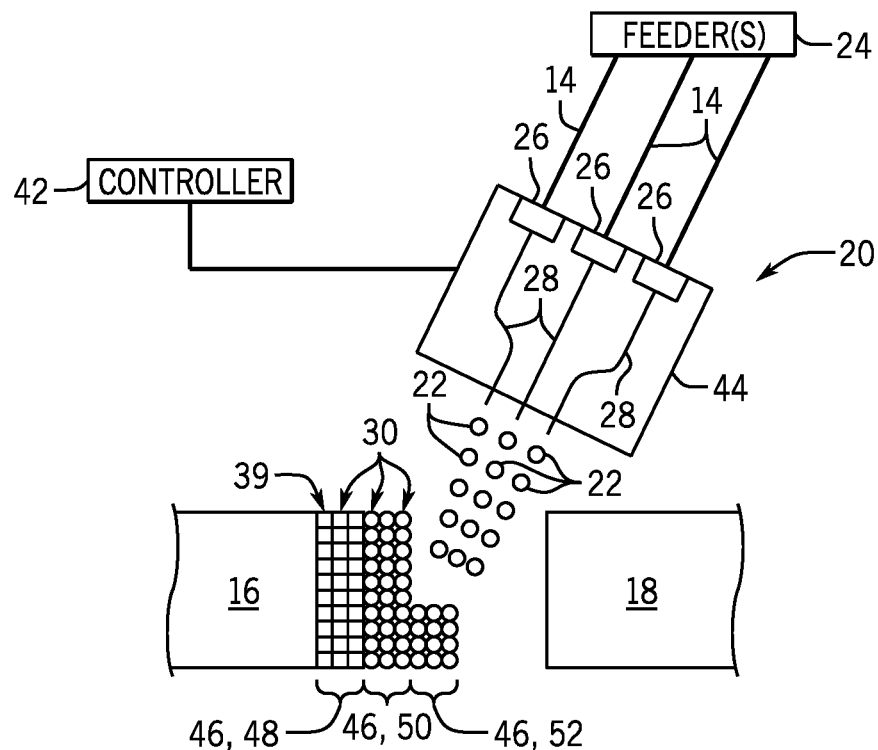
FIG. 3 is a diagram of an embodiment of the manufacturing system with an integrated tool head.

In some embodiments, the controller 42 is coupled to multiple manufacturing tools 20, each supplying a separate anchor material 14 via a respective electrode. The controller 42 may control each of the multiple manufacturing tools 20 to adjust the composition of the part 12 by varying ratios of the anchor materials 14 supplied as droplets 22 by each manufacturing tool 20. As illustrated in FIG. 3, in some embodiments, multiple feeders 24 may be combined in an integrated tool head 44 of the manufacturing tool 20 to supply multiple anchor materials 14 in rows or a grid. The integrated tool head 44 may increase the deposition rate of the anchor materials 14 to form (e.g., print, build up) the part 12. The integrated tool head 44 of the manufacturing tool 20 may have multiple mixers 26 to receive and process the anchor materials 14 into electrodes 28 and/or powder streams. The controller 42 may control each mixer 26 so that each electrode 28 and/or powder stream has the same composition. In some embodiments, the controller 42 controls one or more mixers 26 so that the respective electrode 28 or powder stream has a different composition than the electrode 28 or powder stream from another mixer 26. The integrated tool head 44 may enable the manufacturing tool 20 to form multiple layers 46 of the part at approximately the same time, thereby enabling a reduction of production time for the part 12 by reducing a quantity of passes of the manufacturing tool 20 to form the part 12. A first layer 48 of the part 12 formed of substantially solidified micro-deposits 30 is illustrated with a grid 39. The micro-deposits 30 of a second layer 50 of the part 12 formed between the first layer 48 and a third layer 52 may be hotter than the micro-deposits 30 of the first layer 48, yet sufficiently solidified to support and bond with the deposited droplets 22 of the third layer 52. The controller 42 controls the deposition rate of the droplets 22 and the rate of formation of the layers 46 by the manufacturing tool 20 to enable each layer to bond with the previously formed layer 46. For example, the controller 42 may decrease the deposition rate or rate of layer formation as the manufacturing tool 20 builds up the part 12.

Returning again to FIG. 1, the controller 42 controls a power source 54 (e.g., a current-regulated power source) to adjust the power output (e.g., current output, voltage output, photonic energy) provided to the manufacturing tool 20 to melt the one or more anchor materials 14 into the droplets 22. As may be appreciated, the power source 54 may include, but is not limited to, an engine-driven generator, a welding power supply, an inverter, laser, an induction heater, or any combination thereof. In embodiments where the power source 54 is a welding power supply, the controller 42 may regulate operation (e.g., voltage level and/or current level of output power) of the power source 54 based on a state of an operation, such as a welding operation. For example, the controller 42 may regulate operation of the power source 54 based on the welding operation being in an arc state or a short state.

The controller 42 may control the power source 54 to provide a DC or AC power output to the electrode 28 in a controlled waveform, similar to a pulsed welding process or a short circuit welding process (e.g., regulated metal deposition (RMD™)). In some embodiments, the controller 42 controls the power source 54 and/or the feeder 24 to provide power output to the electrode 28 via the manufacturing tool 20 to enable a modified short circuit welding process (e.g., controlled short circuit) to form the part 12. Additionally, the controller 42 facilitates formation of the part 12 by controlling the manufacturing tool 20 to extend and retract the one or more electrodes 28 during a controlled short circuit welding process. The power output provided to the manufacturing tool 20 melts the electrode 28 into the droplets 22, which are deposited via the arc to the part 12 as micro-deposits 30. That is, in some embodiments, the electrode 28 is a welding wire, the manufacturing tool 20 is a welding torch (e.g., a welding tool) configured for a pulsed welding process or a short circuit welding process, and the feeder 24 is a welding wire feeder. In such embodiments, the welding torch 20 may layer micro-deposits 30 via the arc, thereby forming (e.g., building up, printing) the part 12 from welding wire 28 via a pulsed welding process and/or a short circuit welding process (e.g., RMD™). As may be appreciated, some embodiments of the system 10 may include a gas supply 56 configured to provide one or more shielding gases to the manufacturing tool 20. The one or more shielding gases may include, but are not limited to, argon, carbon dioxide, helium, nitrogen, hydrogen, and combinations thereof. The system may be configured to include a flux delivery system configured to provide one or more fluxes. These fluxes are of different compositions to provide different end results, in particular, metallurgical results.

As described above, the controller 42 may control power output for processes utilizing electrical arc, and/or magnetic, and/or photonic energy to heat the electrode 28. The controller 42 may control the rate at which the droplets 22 are applied to the part 12 by controlling the power source 54. In some embodiments, the controller 42 controls a heating device 58 (e.g., inductor coil, resistive heater) to preheat the electrode 28. Accordingly, the controller 42 may control the heat applied to the electrode 28 to form the droplets 22. Additionally, or in the alternative, the heating devices 58, 60, 62 may enable pre-heating or post-heating of the electrode 28, the first workpiece 16, and/or the second workpiece 18 respectively. Preheating the electrode 28 may reduce the heat applied to the first and second workpieces 16, 18, thereby reducing the formation of a heat affected zone.

The droplets 22 added to the part 12 as micro-deposits 30 affect the heat added to the first workpiece 16 and the second workpiece 18. The formation of the micro-deposits 30 may include, but is not limited to, heating the anchor material 14 (e.g., electrode 28) to form the droplet 22, and cooling the micro-deposit 30 in the part 12. As may be appreciated, the heat of the droplet 22 and the cooling rate of the micro-deposit 30 may affect the microstructure of the micro-deposit 30 formed by the respective droplet 22, thereby affecting the properties of the part 12. For example, the microstructure of the micro-deposits 30 of the part 12 at a first location 64 may be different than the microstructure of the micro-deposits 30 at a second location 66. Additionally, as discussed herein, the application of each droplet 22 to the part 12 may include, but is not limited to, the application rate of droplets 22 to the part 12 and the application location on the part 12 of each micro-deposit 30. The controller 42 may control the temperature of the droplets 22, the application (e.g., deposition) rate, and the application location of each droplet 22 to control the heat applied to the workpieces 16, 18. For example, the controller 42 may reduce the inducement of a heat affected zone (HAZ) that may affect the microstructure and properties (e.g., strength, fatigue life) of the workpieces 16, 18 proximate to the part 12. The temperature, deposition rate, and application location of the droplets 22 in the part 12 affects the heat added to the first workpiece 16 and the second workpiece 18. For example, an arc at 2000° C. adds more heat to the part 12 than an arc at 1200° C. As may be appreciated, high deposition rates (e.g., 60 Hz) of droplets 22 may add less heat to the part 12 than relatively lower deposition rates (e.g., 30 Hz) of droplets 22. Additionally, droplets 22 applied at the first location 64 on the first workpiece 16 add more heat to the first workpiece 16 than droplets 22 applied at the second location 66 on the first workpiece 16. In some embodiments, the controller 42 controls the heating device 58 to affect the application temperature of the micro-deposits 30 in the part 12 to affect the heat added to the first workpiece 16 and the second workpiece 18. The controller 42 may control the feeder 24 and/or the mixer 26 to control the application rate, and the controller 42 may control the power source 54 to control the application rate and the application temperature of the droplets 22 as the micro-deposits in the part 12. In some embodiments, a robotic system 68 coupled to the manufacturing tool 20 may including control circuitry configured to control the application location of the droplets 22 by moving the manufacturing tool 20 along coordinate axes 70 via one or more servomotors 69.

In a similar manner to controlling the heat applied to the workpieces 16, 18, the controller 42 may control the temperature of the droplets 22, the application rate of the droplets 22, and the application location of each droplet 22 to control the heat applied to previously applied micro-deposits 30. For example, the application rate and the temperature of the droplets 22 may affect the cooling rate and microstructure of previously applied micro-deposits 30. The controller 42 may control the application rate and the temperature of the droplets 22 to achieve a desired microstructure for each of the micro-deposits 30 utilized to form the part 12. Accordingly, the controller may control the composition and/or the microstructure of the micro-deposits 30 of the part 12.

In some embodiments, a first heating device 60 may beat the first workpiece 16 near the part 12, and/or a second heating device 62 may beat the second workpiece 18 near the part 12 (e.g., joint). The first and second heating devices 60, 62 may include, but are not limited to, induction coils, resistance heaters, flames, and so forth. The first and second heating devices 60, 62 may interface with one or more surfaces of the respective first and second workpieces 16, 18. For example, the first heating device 60 may extend around the first workpiece 16. The controller 42 may control the first heating device 60 and/or the second heating device 62 to preheat the respective workpieces 16, 18 near the part 12. As may be appreciated, preheating a workpiece 16, 18 may affect the adhesion to micro-deposits 30 from the tool 20. For example, increasing the temperature of the first workpiece 16 may increase the adhesion of the micro-deposits 30 at the first location 64. In some embodiments, the controller 42 independently controls the first and second heating devices 60, 62, thereby enabling the first workpiece 16 to be preheated to a different temperature than the second workpiece 18.

As discussed previously, the first workpiece 16 may be different from the second workpiece 18. For example, the first workpiece 16 may be aluminum and the second workpiece 18 may be steel. In some embodiments, the first and second workpieces 16, 18 may be the same or different compositions with the same base metal (e.g., aluminum, titanium, iron, galvanized-coated material, high strength steel). For example, the first workpiece 16 may be a nickel coated steel, and the second workpiece 18 may be a relatively high-carbon steel. The first workpiece 16 may have different properties and/or structure than the second workpiece 18. For example, the melting temperature, thermal conductivity, and strength, among other properties, may differ between the first workpiece 16 and the second workpiece 18. Additionally, or in the alternative, the first workpiece 16 and the second workpiece 18 may have different sensitivities to heat. For example, the first workpiece 16 may be annealed at a melting temperature of the second workpiece 18. Accordingly, annealing the first workpiece 16 (e.g., by heating it to the melting temperature of the second workpiece 18) may affect properties (e.g., strength, fatigue-life) of the first workpiece 16.

As may be appreciated, the heat affected zone (HAZ) of a metal may be defined herein as the area of the metal in which the properties and/or microstructure of the metal has been affected by heat. In some embodiments, the controller 42 may independently control the heat applied to the electrode 28, the heat applied to the first workpiece 16 (e.g., via the first heating device 60), and the heat applied to the second workpiece 18 (e.g., via the second heating device 62). Through independent control of the heat applied to these components, the system 10 may reduce the HAZ of the first workpiece 16 and/or the second workpiece 18. For example, if the first workpiece 16 is aluminum and the second workpiece 18 is a steel with a higher melting temperature than the first workpiece 16, the controller 42 may control the manufacturing tool 20 to apply the droplets 22 near the second workpiece 18 (e.g., steel) with more heat and/or at a higher rate than the droplets 22 near the first workpiece 16 (e.g., aluminum).

The controller 42 may control the composition and the formation of each of the droplets 22 applied to build the part 12 with micro-deposits 30 as the manufacturing tool 20 moves between the first workpiece 16 and the second workpiece 18. In this way, the system 10 may control the composition and structure (e.g., spatial distribution of the micro-deposits 30) of the part 12 to have a desired set of properties while controlling the HAZ of the first and/or second workpieces 16, 18.

One or more sensors 72 may be used to detect certain operating parameters of the system 10. Although illustrated as being part of the welding tool 20, in other embodiments, the sensors 72 may be part of any other components of the system 10, including the feeder 24, the power source 54, the gas supply 56, the robotic system 68, or any combination thereof. In certain embodiments, the controller 42 may use the detected operating parameters as feedback to control various operating parameters of the system 10. For example, in certain embodiments, the sensors 72 (e.g., temperature sensors) may measure the temperature and cooling rate of the electrode 28, the first workpiece 16, and/or the second workpiece 18. Feedback from the sensors 72 may be stored as temperature history of the electrode 28, the first workpiece 16, and/or the second workpiece 18. The controller 42 may use this temperature history to control the composition and structure of the part 12. In some embodiments, the sensors 72 (e.g., optical sensors, proximity sensors, and so forth) may measure the position of the manufacturing tool 20, first workpiece 16, and second workpiece 18 relative to the set of coordinate axes 70. The controller 42 may control the application of the droplets 22 to the part 12 based at least in part on the relative distance from the first workpiece 16 and/or the second workpiece 18. For example, in some applications, the part 12 may be formed to have a gradient composition of the first and second anchor materials 36, 38, such that the composition of the part 12 adjacent to the first workpiece 16 is compatible (e.g., forming a strong bond) with the first workpiece 16, and the composition of the part 12 adjacent to the second workpiece 18 is compatible (e.g., forming a strong bond) with the second workpiece 18.

The controller 42 may independently control the thermal cycle, peak temperature, and cooling rates of each of the micro-deposits 30 based at least in part on the application location in the part 12. The controller 42 may independently control the composition and the formation of each of the droplets 22 for the application location according to a set of instructions (e.g., code) executed by a processor 74. The processor 74 may load the set of instructions from a memory 76 based at least in part on the workpieces 16, 18 and the anchor materials 14. In some embodiments, an operator (e.g., from a host computer) may provide the set of instructions directly to the controller 42 via an operator interface 78. For example, the operator may load a set of instructions for forming the part 12 from a three-dimensional model (e.g., computer aided design (CAD) model) of the anchor produced by a three-dimensional 3D CAD tool. In some embodiments, the controller 42 may receive and/or produce a set of instructions to produce the part 12 with a desired composition of anchor materials 14. For example, the controller 42 may utilize a 3D CAD model of the part 12 to control the robotic system 68 to produce the part 12 from the anchor materials 14. Although described herein as controlling the robotic system 68, in other embodiments, the controller 42 may not be used to control the robotic system 68. Rather, in such embodiments, separate control circuitry of the robotic system 68 may control the robotic system 68, for example, to control mechanical oscillation of the welding tool 20. Alternatively, in certain embodiments, the controller 42 may operate in conjunction with control circuitry of the robotic system 68. Additionally, or in the alternative, an operator may input information about the workpieces 16, 18 and the anchor materials 14 into the operator interface 78, and the controller 42 may determine and/or modify the set of instructions to form the part 12 with desired characteristics. The set of instructions directs the controller 42 to control the composition, formation, and application of each droplet 22 as a micro-deposit 30 to form the part 12 with desired characteristics.

The controller 42 may use input from the sensors 72 to individually control each droplet 22 applied to the part 12 as a micro-deposit 30. In some embodiments, the controller 42 may adapt the set of instructions based at least in part on the input from the sensors 72 to compensate for changes to the first workpiece 16, the second workpiece 18, or the part 12. For example, the controller 42 may adapt the application location and/or the heating of the droplets 22 during the formation of the part 12 if the input from the sensors 72 indicates a change in the fit-up of a joint between the first workpiece 16 and the second workpiece 18. Additionally, or in the alternative, the controller 42 may adapt the application and/or the heating of the droplets if the input from the sensors 72 indicate a deflection or burn through of the first workpiece 16 and/or the second workpiece 18 and/or the previous layer. The controller 42 may adapt the temperature of the first workpiece 16 and/or the temperature of the second workpiece 18 (e.g., via the heating devices 60, 62) during the formation of the part 12 if the input from the sensors 72 indicates a deflection or burn through of the first workpiece 16 and/or the second workpiece 18 and/or the previous layer.

The system 10 may build the part 12 between the first workpiece 16 and the second workpiece 18 by manual or automatic movement of the manufacturing tool 20. In some embodiments, the droplets 22 may be deposited via the arc (e.g. spray) as shown in FIG. 1. In some embodiments as illustrated in FIG. 2, the electrode 28 contacts the workpiece and/or part 12, and the manufacturing tool 20 applies the respective micro-deposits 30 via short circuit. In some embodiments, an operator begins or resumes building the part 12 by actuating a trigger 80 on the manufacturing tool 20. The controller 42 determines a location of the manufacturing tool 20 relative to the workpieces 16, 18 via the sensors 72, and the controller 42 determines the application location of the micro-deposits 30 prior to formation of the droplets 22 of the desired composition according to the set of instructions. In some embodiments, the robotic system 68 controls the movement of the manufacturing tool 20 along the coordinate axes 70, such as via servomotors 69. The controller 42 may control the robotic system 68 with the set of instructions to move the manufacturing tool 20 to apply the controlled droplets 22 as micro-deposits 30 to respective locations in the part 12 based on the set of instructions. The robotic system 68 thereby enables the controller 42 to automatically form parts 12 with a desired composition and geometry. In some embodiments, the robotic system 68 may form (e.g., print, build up) the parts 12 from the one or more anchor materials 14 separate from the workpieces 16, 18. The formed parts 12 may later be joined with the workpieces 16, 18.

Again, as described above, although the description of FIGS. 1-3 has been primarily focused on additive manufacturing techniques (i.e., where the manufacturing tool 20 is an additive manufacturing tool), in other embodiments, the system 10 may instead be a welding system 10 wherein the manufacturing tool 20 is a welding torch configured to feed a welding wire (e.g., the electrode 28) from a welding wire feeder (e.g., the feeder 24). As such, in such embodiments, instead of including components for suppling one or more anchor materials 14, the feeder 24 may instead be a welding wire feeder including components (e.g., a welding wire spool, welding wire drive assembly, and so forth) for feeding a welding wire electrode 28 from the feeder 24. In addition, in such embodiments, the manufacturing tool 20 may be a welding torch configured to feed the welding wire electrode 28 received from the welding wire feeder 24 toward the workpieces 16, 18 to establish a welding arc with one or more of the workpieces 16, 18.

In certain embodiments, the manufacturing tool 20 may be a handheld tool, such as a handheld welding torch (e.g., manipulatable by a human operator), whereas in other embodiments, the manufacturing tool 20 may be used in fully automated or semi-automated processes (i.e., either fully controlled or partially controlled by a robotic system, such as the robotic system 68 described herein). In any event, the manufacturing tool 20 described herein is external to (i.e., separate from) the feeder 24 and the power source 54 described herein.

Figure 4:
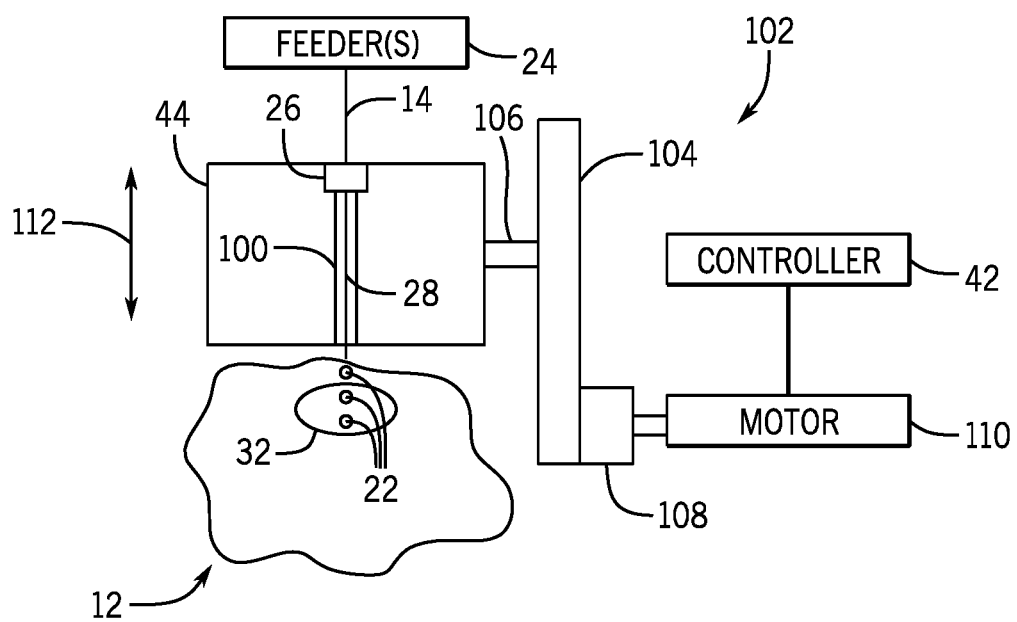
FIG. 4 is a schematic of a mechanical oscillation system of the manufacturing system.

Regardless of whether the system 10 is an additive manufacturing system or a welding system, in certain embodiments, the integrated tool head 44 of the manufacturing tool 20 may be configured to mechanically oscillate (i.e., move up and down away and towards the puddle 32) to further improve deposition of the droplets 22 onto the part 12. In other words, the integrated tool head 44, through which the electrode 28 and a liner 100 disposed about the electrode 28 extend, may be oscillated to move the electrode 28 and the liner 100 towards and away from the puddle 32. In FIG. 4, a mechanical oscillation system 102 is shown coupled to the integrated tool head 44. The mechanical oscillation system 102 includes a mechanical linkage assembly coupled to the integrated tool head 44. In the illustrated embodiment, the mechanical linkage assembly includes a piston 104 coupled or fixedly attached to the integrated tool head 44 (e.g., via a pin 106), a cam 108 coupled to the piston 104, and a motor 110 configured to drive rotation of the cam 108. In other embodiments, the mechanical linkage assembly and/or the mechanical oscillation system 100 may be directly coupled to the liner 100 to oscillate the liner 100 toward and away from a workpiece. In operation, the mechanical oscillation system 102 periodically shortens or lengthens the path that the electrode 28 must travel to the puddle 32 by moving the liner 100 toward and away from the puddle 32 (e.g., a workpiece). In this manner, the mechanical oscillation system 102 may be used to break or remove the electrode 28 from the puddle 32 to help form the droplets 22 in a controlled manner. The mechanical oscillation system 102 also may be operated to regulate or control a state of a welding operation. For example, the mechanical oscillation system 102 may operate to enable or improve switching of the welding operation between an arc state and a short state.

In certain embodiments, the mechanical oscillation system 102 may be disposed within the tool 20 (e.g., within a housing of the welding tool 20). In other embodiments, the mechanical oscillation system 102 may be disposed external to the tool 20. For example, in such embodiments, the mechanical oscillation system 102 may be at least partially integrated with the robotic system 68 described herein. In any event, in certain embodiments, the mechanical oscillation system 102 is disposed external to (e.g., outside of a housing of) the feeder 24 and the power source 54 described herein. It will be appreciated that the integrated tool head 44 and the liner 100 are at least partially disposed within the tool 20, and external to (e.g., outside of a housing of) the feeder 24 and the power source 54 described herein, during operation.

As discussed in detail below, the manufacturing tool 20 with the mechanical oscillation system 102 disclosed herein may be operated at substantially fixed frequencies and/or with a limited (e.g., substantially fixed) travel distance of the integrated tool head 44. As a result, the simplicity of the process may be increased, while significantly reducing costs of the manufacturing tool 20 and the mechanical oscillation system 102. For example, the disclosed mechanical oscillation system 102 enables the formation of the droplets 22 at a low welding current. As will be appreciated, in other embodiments, the mechanical oscillation system 102 may have other components. For example, instead of the motor 110, piston 104, and cam 106, the mechanical oscillation system 102 may be an electro-magnetic system that includes coils, magnets, other mechanical linkage assemblies, and so forth, to enable an oscillating motion of the integrated tool head 44, or other structural component, and therefore the liner 100 coupled to the integrated tool head 44. In certain embodiments, the mechanical oscillation system 102 may directly interact with the liner 100 to enable oscillating motion of the liner 100. In other words, the structural component that is mechanically oscillated by the mechanical oscillation system 102 may be the liner 100 (i.e., instead of the integrated tool head 44 indirectly causing the mechanical oscillation of the liner 100).

As mentioned above, the illustrated mechanical oscillation system 102 (e.g., mechanical linkage assembly) includes the piston 104 coupled or fixedly attached to the integrated tool head 44, the cam 108 coupled to the piston 104, and the motor 110 configured to drive rotation of the cam 108. In certain embodiments, the operation of the motor 110 may be controlled and/or regulated by the controller 42. As the motor 110 drives rotation of the cam 108, the rotation of the cam 108 will actuate the piston 104 up and down, as indicated by arrows 112. Thus, the integrated tool head 44, which may include a bushing, collar, gas nozzle, contact tip, a gas diffuser, an inlet wire guide, or other component fixed to the piston 104, also travels up and down. In this manner, the liner 100 and the electrode 28 are moved towards and away from the puddle 32. As will be appreciated, the travel distance of the integrated tool head 44 may be selected based on a size and/or geometry of the cam 108.

When the integrated tool head 44 oscillates upward, the liner 100 and the electrode 28 are pulled away from the puddle 32, and as the integrated tool head 44 oscillates downward, the liner 100 and the electrode 28 are moved downward toward the puddle 32. Of course, while the mechanical oscillation system 102 is operating and moving the integrated tool head 44 up and down, the electrode 28 is continuously being fed downward toward the puddle 32. Thus, the electrode 28 may have an overall travel distance, which is represented by line 120 in the graph 122 of FIG. 5. As will be appreciated, a peak to peak amplitude 124 of the line 120 may represent the travel distance of the mechanical oscillation system 102 (e.g., the piston 104 and the integrated tool head 44). The gradual increase in overall travel distance of the line 120 may be attributed to the constant feeding of the electrode 28 by the feeder 24.

As mentioned above, the liner 100 is disposed about the electrode 28, and the liner 100 is held and supported by the integrated tool head 44. Thus, when the mechanical oscillation system 102 oscillates the integrated tool head 44, the integrated tool head 44 similarly oscillates the liner 100 directly, but may not directly oscillate the electrode 28. To help facilitate oscillation of the electrode 28 as well, the size of liner 100 may be selected to enable oscillation of the electrode 28 as well.

Figure 5:
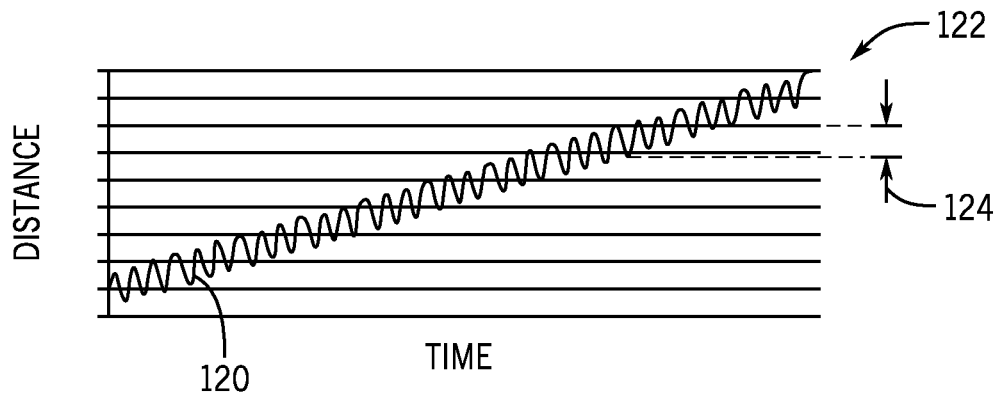
FIG. 5 is a graph illustrating a traveled distance of an electrode with respect to time.
Figure 6A:
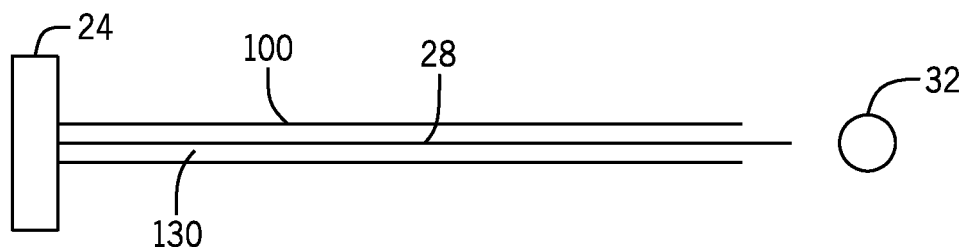
FIG. 6A is a schematic of a liner and an electrode of the manufacturing system.
Figure 6B:
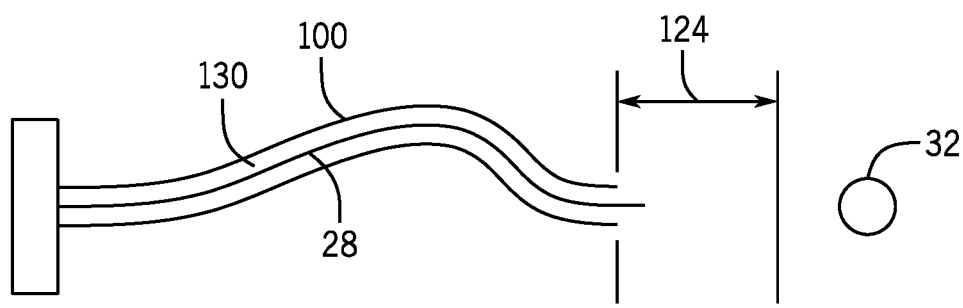
FIG. 6B is a schematic of a liner and an electrode of the manufacturing system.

Oscillation of the liner 100 and the electrode 28 is shown schematically in FIGS. 6A and 6B. The integrated tool head 44 and the mechanical oscillation system 102 are not shown. In FIG. 6A, the liner 100 and electrode 28 have not been oscillated upwards by the integrated tool head 44 and the mechanical oscillation system 102. In other words, in FIG. 6A, the liner 100 and electrode 28 are extended fully downward towards the puddle 32. However, in FIG. 6B, the liner 100 and electrode 28 are shown as retracted from the puddle 32 due to oscillation of the mechanical oscillation system 102. In particular, the liner 100 and electrode 28 are retracted the distance 124 (i.e., the peak to peak amplitude shown in FIG. 5). As will be appreciated, a space or gap 130 may exist between the liner 100 and electrode 28, as the liner 100 is a tube or sheath disposed about the electrode 28. This gap 130 may be considered when selecting the size of the cam 108 and/or the sizes and geometries of other components of the mechanical oscillation system 102. Specifically, as the liner 100 is directly retracted by the integrated tool head 44 and the mechanical oscillation system 102, the liner 100 may initially retract without similar retraction of electrode 28 due to the gap 130 between the liner 100 and the electrode 28. Once the liner 100 is directly retracted an initial amount, the liner 100 and the electrode 28 may contact one another and frictionally engage, thereby enabling the retraction of the electrode 28 as well. To ensure the electrode 28 retracts a desired amount (i.e., distance 124), the initial retraction of the liner 100 and the gap 130 between the liner 100 and the electrode 28 may be considered when selecting the sizes and geometries of the components of the mechanical oscillation system 102, such as the cam 108. In certain embodiments, the gap 130 between the liner 100 and electrode 28 may be minimized to improve consistency and accuracy of the oscillating movement of the liner 100 and electrode 28.

The somewhat fixed frequency and fixed distance operation of the mechanical oscillation system 102 enables increased simplicity and greatly reduced cost of the manufacturing tool 20, and thus may not be greatly customizable. However, customization and modification of the operation of the manufacturing tool 20 may be enabled by adjusting, regulating, or otherwise controlling electrical power of the manufacturing tool 20. In certain embodiments, the power source 54 may be controlled such that a constant current is applied to the electrode 28. In particular, if the distance 124 that the mechanical oscillation system 102 retracts the electrode 28 from the puddle 32 is sufficiently great, the welding current may remain at a fixed level. The fixed current level may be relatively low, but great enough to melt the electrode 28 and form one droplet 22 at a time. The low constant current may also not cause agitation of the puddle 32.

However, in other embodiments, one or more simple dynamic changes may be applied to the welding current. For example, the controller 42 may regulate operation of the power source 54 to adjust different dynamics of the welding current. For example, dynamic wave shaping may be used, but the changes may be relatively minor to maintain simplicity and low costs. For example, when the liner 100 and electrode 28 are retracted by the mechanical oscillation system 102, and after an arc is initiated at low current, the current supplied by the power source 54 may be increased by the controller 42. Increasing the current at this time may help form the next droplet 22, help reduce the possibility of puddle 32 oscillations reattaching to the electrode 28, and/or increase the amount of electrode 28 that can be deposited with the next droplet 22.

As the mechanical oscillation system 102 oscillates the liner 100 and electrode 28 back toward the puddle 32, the current may be reduced (e.g., by the controller 42) as the electrode 28 nears the puddle 32. Reducing the current may help reduce the possibility of the electrode 28 burning away as the electrode 28 tries to contact the puddle 32 and/or reduce the possibility of the electrode 28 and the next droplet 22 contacting the puddle 32 and being "rejected" by the puddle 32. In other embodiments, the current may be maintained at a level substantially lower (e.g., at least 10, 20, 30, 40, 50, 60, 70, or 80 percent lower) than a peak current level (e.g., below 100 amps, below 75 amps, below 50 amps, below 25 amps, between 10-100 amps, between 10-75 amps, between 10-50 amps, between 10-25 amps, and so forth) of the system 10 as the liner 100 and electrode 28 are oscillated toward and/or away from the puddle 32. In general, the substantially lower current level may be below 100 amps to avoid spatter, but above 10 amps to avoid the arc going out.

After the next droplet 22 is formed during the arc, and as the mechanical oscillation system 102 is about to oscillate toward the puddle 32 again, the current may remain reduced or be reduced further to further reduce puddle 32 agitation. Holding the current low (e.g., substantially lower than a peak current level, as previously described) as the mechanical oscillation system 102 (and the liner 100 and electrode 28) oscillate back away from the puddle 32 also helps leave the newly formed droplet 22 in the puddle 32. More specifically, the current may be held low during a short, and after the short clears, the current may briefly increased to form the droplet 22. The current may also be held low, as discussed above, immediately prior to a state change of a welding operation (e.g., immediately prior to a short or an arc). In certain embodiments, this may be accompanied by a constant voltage. After the droplet 22 is formed, the current is then lowered to reduce agitation of the puddle 32 as the electrode 28 is oscillated away from the puddle 32 again by the mechanical oscillation system 102.

To synchronize operation of the mechanical oscillation system 102 and the power source 54 to achieve the operation described above, the sensors 72 may include position sensors or other types of sensors that detect a location of the integrated tool head 44 at a particular time. For example, the sensors 72 may detect a position of the integrated tool head 44, the piston 106, the cam 108, the liner 100, the electrode 28, or other component. Based on the one or more detected positions, the controller 42 may regulate operation of the power source 54 such that the current output of the power source 54 is a desired level for a particular position of the electrode 28. Other types of sensors 72 may also be used to detect other operating parameters, which may be used to also synchronize operation of the mechanical oscillation system 102 and the power source 54. For example, one or more of the sensors 72 may include voltage-sensing circuitry and/or current-sensing circuitry, which may be used to detect voltage and/or current of the power source 54 and/or the motor 110 (e.g., and therefore detect a state of a welding operation, such as a short or an arc). Other operating parameters may be detected by the sensors 72, such as a phase of operation of the mechanical oscillation system 102, the power source 54, and/or the motor 110, welding arc presence, a short circuit (short circuits per second), angular velocity of the motor 110, load on the motor 110, wire feed speed, arc length, a clearing event, a shorting event, an arc event, a state change, or other operating parameter of the system 10.

Figure 7:
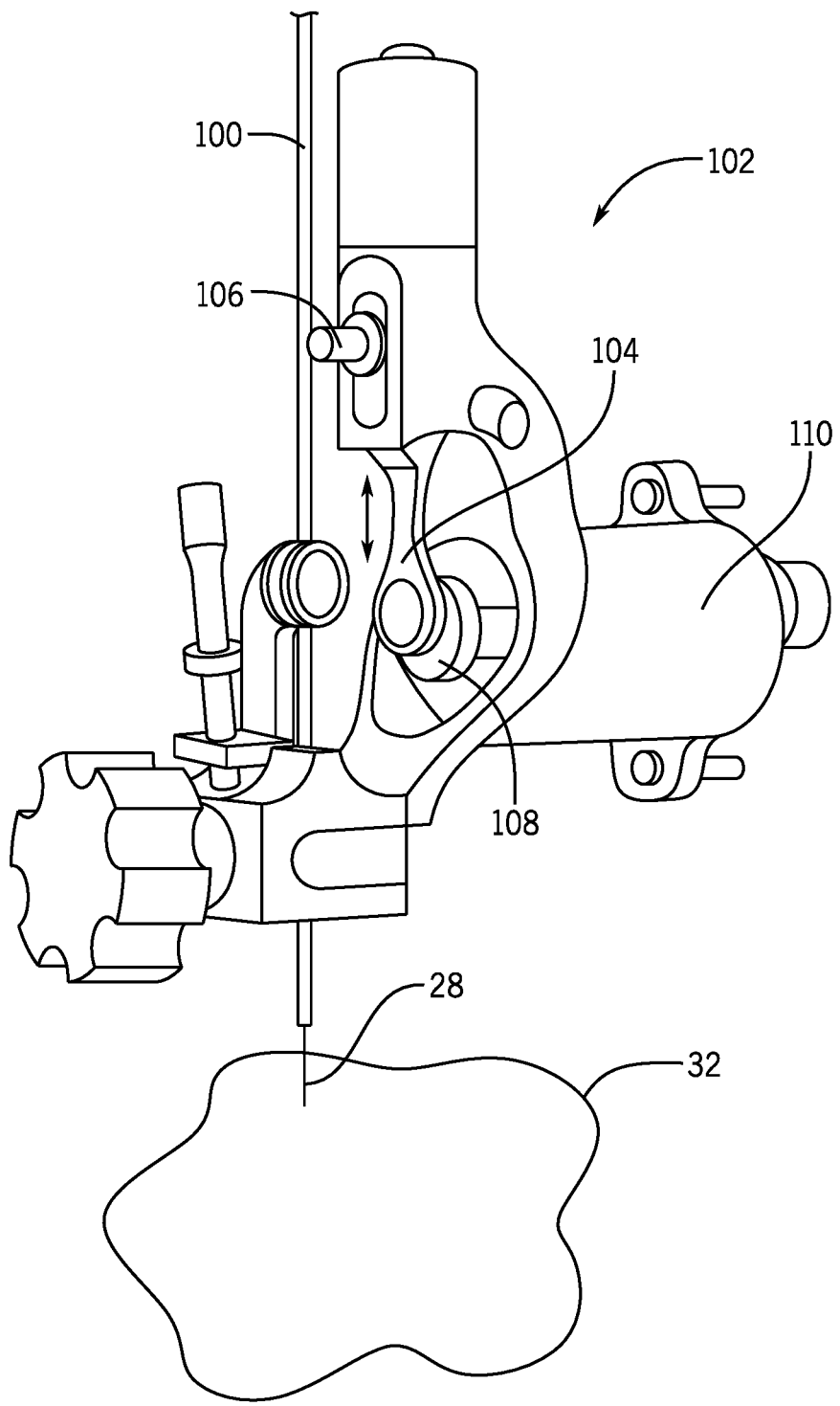
FIG. 7 is a perspective view of the mechanical oscillation system of the manufacturing system.

FIG. 7 is a perspective view of an embodiment of the mechanical oscillation system 102, illustrating the mechanical linkage assembly having the piston 104, the cam 108, and the motor 110. As discussed above, the liner 100 may be secured to the piston 104 via the pin 106 or other coupling feature. As the motor 110 drives rotation of the cam 108, the piston 104 is actuated up and down in an oscillating manner, thereby oscillating the liner 100 and electrode 28 up and down. Thus, the electrode 28 is moved toward and away from the puddle 32. In this manner, the mechanical oscillation system 102 enables a simple and cost effective method of operating the manufacturing tool 20.

In another embodiment, a contact tip is moved along with the liner 100. In this case, the contact tip has higher friction then the liner and facilitates tighter control. In addition, this motion also inherently changes the distance from the point of current conduction in the contact tip to the weld. Whereas when the contact tip is in a largely fixed location, the distance between the point of current conduction in the contact tip to the weld is nearly constant. In either case, the key effect of retracting the wire from the molten weld is accomplished. Similarly, in other embodiments, the liner 100 may be moved along with a gas nozzle, collar, bushing, or other structural component surrounding or coupled to the liner 100.

The embodiments described herein generally require that the droplets 22 be deposited in a very controlled manner One method is to use a welding process that is very controlled, such as tungsten inert gas (TIG) applications and low-heat input metal inert gas (MIG) applications. When closely controlled, most welding processes under ideal conditions can replicate additive manufacturing processes. The most controlled welding processes include Accu-Pulse™, RMD™, and controlled short circuit (CSC) welding process. The RMD™ and CSC processes are short circuit welding processes. Theses short circuit welding processes are relatively effective for additive manufacturing because they involve relatively low heat. By comparison, spray and pulsed spray welding processes are relatively hotter, and therefore create a more fluid puddle, which is not as effective for precise buildup (e.g., the puddle and resultant weld bead would tend to get too wide).

CSC processes, which are described in more detail in U.S. Pat. Nos. 6,963,048, 6,969,823, and 6,984,806, each of which is hereby incorporated by reference in their entireties, use both electrical power modulations as well as forward/reverse movement of welding wire to maximize metal deposition. In general, in CSC processes, a short circuit state is entered by advancing the wire until the wire touches the weld pool, and then an arc state is entered by retracting the wire until the wire does not touch the weld pool, at which point an arc forms. CSC processes typically employ sophisticated power output control techniques to control the energy delivered to the weld. By separating the control of the transitions between the states from the control of energy delivered to the weld, CSC processes allow for better control of each.

In general, a CSC system requires the capability of advancing and retracting the wire. Conventional CSC systems utilize certain mechanical means, such as stepper motors, to control the advancement and retraction of the wire. For example, such CSC welding systems dynamically control a motor direction (e.g., forward/reverse, clockwise/counter-clockwise) to turn a drive wheel of a welding wire feeder. As such, in such CSC systems, when the wire is being fed toward the weld, the mechanical means employed by conventional CSC systems have a relatively high level of momentum in the feeding direction against which the mechanical means must counter in the opposite direction in order to retract the wire.

In addition, as described herein, conventional short circuit processes are relatively colder than pulse or spray MIG processes. One problem with conventional short circuit transfer is that it generally depends on a "pinch effect" to separate the molten ball from the solid welding wire. The pinch effect is driven by relatively high current. When the ball separates, a plasma is re-ignited at this relatively high current level. This makes for a relatively strong plasma force that pushes the puddle away from the end of the welding wire, which can cause undesired puddle agitation. A short-by-short process (e.g., RMD™), which is described in more detail in U.S. Pat. Nos. 6,326,591 and 6,800,832, both of which are hereby incorporated by reference in their entireties, is an alternative solution. In general, RMD™ still uses a pinch effect, but predicts when the ball will separate from the welding wire, and reduces the current before the separation occurs. This prediction method works well, and is a close alternative. However, by comparison, the CSC process and the invention described herein do not need to use relatively high current to separate the ball, so no prediction is required, and the risk of igniting a plasma at a relatively high current is eliminated. In particular, the reverse wire action removes the need for high currents to "pinch" the molten ball off the end of the welding wire. By eliminating this peak current, the stability of the process is increased and a colder process can be achieved vs. conventional short circuit or even RMD™ welding processes.

Certain embodiments of the present disclosure enable systems and methods for providing welding-type power using a welding wire feeder 24 that provides a welding wire electrode 28 to an arc, and a power source 54 that provides power to the arc. The mechanical oscillation system 102 described herein facilitates movement of the welding wire electrode 28 toward and away from the arc. In certain embodiments, the controller 42 controls the oscillating motion, controls the power source 54 to provide a desired mean arc current, controls a welding wire spool, welding wire drive assembly, and so forth, of the feeder 24 to control the average wire feed speed of the welding wire electrode 28, or any combination thereof. In addition, in certain embodiments, the controller 42 may include various control modules, such as a mean arc current or arc voltage control module to control a current or voltage of the welding power output of the power source 54 to a desired mean arc current or voltage and/or a short detection feedback circuit.

In other embodiments, the control of the oscillating motion, control of the welding power output of the power source 54, and control of the wire feed speed may not be controlled by the same controller 42. Rather, in such embodiments, each may be set to run at a nominal setting, and each may be robust enough to respond to the expected responses of the other components in the system 10. Such embodiments may result in reduced complexity of the system 10. For example, a strong and relatively fast (e.g., on the order of 20 kHz) constant voltage (CV) response during the arc phase and/or the short phase would modulate the current much faster than the short circuit frequency, and affect the burn off rate in order to maintain a desired voltage.

Voltage is a strong indicator of arc length. In certain embodiments, the controller 42 may also automatically adapt on a slower time scale by adjusting nominal settings of the system 10. For example, if the controller 42 detects relatively short arc lengths during one or more arc phases, the nominal wire feed speed may be reduced, or the initial current that the power source 54 uses for the arc phase or short phase could be increased by the controller 42, or the oscillation frequency could be changed by the controller 42 (e.g., by adjusting a speed of the motor 110 of the mechanical oscillation system 102). Each such adjustment would tend to increase the average arc length.

In certain embodiments, a "synergic" control could be used by the controller 42, whereby in changing settings in one system, the nominal settings of the other systems may also be changed. For example, if the average wire feed speed is increased, the power level of the power source 54 may be increased (e.g., by increasing the voltage, current, or both, of the power source 54) and/or the oscillation frequency of the mechanical oscillation system 102 may be increased. In other words, in general, the power level (e.g., voltage, current, or both) of the power source 54 may be synchronized with the mechanical oscillation of the mechanical oscillation system 102. For example, in certain embodiments, this could be done based on a table of matched settings. Adjusting one setting sends an adjustment to the other components in the system 10. Synergic is a common term in the welding industry to describe a system where by adjusting one parameter, many parameters are changed to ideal nominal matched settings.

As such, the embodiments described herein facilitate relatively low cost, yet improved performance, over conventional MIG welding processes. In particular, the mechanical oscillation system 102 described herein enables relatively low cost oscillation of the welding wire electrode 28, while still enabling CSC-style processes. Conventional MIG welding processes, including CSC processes, can have short circuits of approximately 25 to over 200 times per second. The embodiments described herein reduce the cost by reducing the mass that has to move as much as possible. In certain CSC welding systems, a stepper motor has to change the direction of the wire, a liner, wire feed rollers, and the motor itself. Of these, the inertia of the motor itself is arguably the greatest. In contrast, in the embodiments described herein, the motor 110 does not change direction, thus removing the requirement of decelerating an armature of the motor 110 and re-accelerating in the opposite direction at the oscillation frequency of the process (e.g., between 20 and 200 cycles/second, in certain embodiments). Certain CSC welding systems also require the cost and complexity of an "H-bridge" electrical drive, and a sophisticated controller to manage the electrical drive, whereas the embodiments described herein do not.

In addition, oscillation at a substantially fixed frequency and/or with a substantially fixed travel distance simplifies the system 10 and reduces costs. In certain embodiments, an engraver or a low cost tattoo machine may be used as part of the mechanical oscillation system 102, and have a relatively fixed travel distance and a relatively fixed oscillation frequency. A relatively fixed travel distance and a relatively fixed oscillation frequency greatly reduces the cost of the system 10 (e.g., due at least in part to the tradeoff of flexibility for cost). Certain conventional CSC systems use stepper motors to dynamically advance and reverse the wire, where the distance and speed of each individual forward and reverse motion are independent and individually controlled. In contrast, in the embodiments described herein, the oscillation distance of the mechanical oscillation system 102 is relatively fixed, for example, by the size of the cam 108, and the speed of the oscillation of the mechanical oscillation system 102 is controllable by, for example, adjusting the speed of the motor 110 (i.e., to cause more or fewer shorts per second). In certain embodiments, a stepper motor could be used to offer more dynamic advancement and retraction motion, but would likely increase the cost and complexity of the system 10.

As described herein, the controller 42 may be used to control the electrical power of the welding process to compensate for the relative lack of flexibility of the mechanical oscillation system 102. In particular, since the frequency and distance of the mechanical oscillation are relatively fixed during operation of the mechanical oscillation system 102, the controller 42 may control the electrical power of the welding process (e.g., welding power delivered by the power source 54) based on feedback relating to the welding process (e.g., timing of phases of the welding process (such as a short circuit phase 154, an arc re-establish phase 158, and so forth), timing of mechanical oscillation of the mechanical oscillation system 102, and so forth). For example, since the cycles of the mechanical oscillation of the mechanical oscillation system 102 remain relatively fixed during operation of the mechanical oscillation system 102 due to the relatively fixed frequency and distance of the mechanical oscillation of the mechanical oscillation system 102, the controller 42 may synchronize the delivery of the welding power from the power source 54 with the cycles of the mechanical oscillation of the mechanical oscillation system 102. For example, in certain embodiments, the controller 42 may periodically calibrate the delivery of the welding power from the power source 54 based on feedback relating to the welding process (e.g., timing of phases of the welding process (such as a short circuit phase 154, an arc re-establish phase 158, and so forth), timing of mechanical oscillation of the mechanical oscillation system 102, and so forth), for example, using sensor feedback (e.g., via the sensors 72 described herein) to detect the exact timing of a short circuit, an arc, and so forth, and adjust timing of transitions between states of the welding power based on this feedback (see, e.g., FIGS. 8-10).

As described above with respect to FIG. 5, the welding wire electrode 28 will have an oscillating motion in combination with a steady, but relatively slower, motion of the welding wire electrode 28 moving forward at a fixed, yet slower, rate. As opposed to retracting the welding wire electrode 28 by lifting the entire welding torch 20, or reversing the feed motor, the embodiments described herein force the welding wire electrode 28 to traverse a relatively longer path. Assuming the source of welding wire electrode 28 (e.g., the welding wire feeder 24) and the weld puddle 32 are largely fixed locations, the welding wire electrode 28 may be retracted from the puddle 32 by forcing the welding wire electrode 28 to travel the relatively longer distance (see, e.g., FIGS. 6A and 6B). In particular, the liner 100 has a substantially fixed length. Pulling the liner 100 up and out of the contact tip of the welding torch 20 will, in effect, create a longer liner 100. When the liner 100 changes direction, excess space between the liner 100 and the welding wire electrode 28 must be absorbed. This small distance must be added to the amount that the liner 100 must move. A minimal amount of excess space between the liner 100 and the welding wire electrode 28 is ideal.

As described above, the mechanical oscillation system 102 may have a substantially fixed oscillation frequency and/or a substantially fixed oscillation travel distance to simplify the system 10 and reduces costs of the system 10. As described herein, properties referred to as "substantially fixed" or "relatively fixed" are intended to describe properties that do not vary more than a substantially small amount (e.g., less than 5 percent, less than 4 percent, less than 3 percent, less than 2 percent, less than 1 percent, or even less) during operation. It will be appreciated that, in certain embodiments, a speed of the motor 110 of the mechanical oscillation system 102 may be adjusted by the controller 42, thereby adjusting the frequency of the mechanical oscillation. However, once the speed of the motor 110 is adjusted by the controller 42, the frequency of the mechanical oscillation will remain substantially fixed during operation of the mechanical oscillation system 102. In contrast, in certain embodiments, the distance of the mechanical oscillation remains substantially fixed at all times due at least in part to inherent physical characteristics of the components of the mechanical oscillation system 102.

One problem with a substantially fixed oscillation frequency and a substantially fixed oscillation travel distance is that either of these properties may not actually be in synch with the puddle 32 and the actual ball detachment. However, as described herein, the controller 42 may dynamically adjust the electrical power (e.g., voltage, current, or both) generated by the power source 54 to compensate for the relative lack of sophistication (i.e., lack of flexibility of operation via wider ranges of oscillation frequency and oscillation travel distance) of the mechanical oscillation system 102. In particular, the electrical power generated by the power source 54 is controlled by the controller 42 based on feedback relating to the welding process (e.g., timing of phases of the welding process (such as a short circuit phase 154, an arc re-establish phase 158, and so forth), timing of mechanical oscillation of the mechanical oscillation system 102, and so forth). The simplest solution would be to use a conventional constant current (CC) welding power source as the power source 54. In such an embodiment, if the oscillation retraction distance is large enough, the welding current from the power source 54 may be set at a relatively fixed level just high enough to melt the welding wire electrode 28 one ball 34 at a time but still relatively low such that not much puddle agitation is caused and such that molten material will not be ejected from the puddle 32 or off the end of the welding wire electrode 28 (i.e., commonly referred to as spatter). In certain embodiments, a control loop may be used by the controller 42 to dynamically adjust the average current and/or the average wire feed speed to maintain a steady and stable process.

In certain embodiments, the process may be improved over a relatively constant current process by implementing dynamic changes to the welding voltage and/or current (i.e., the "wave shape"). As described above, examples of wave shaping include Accu-Pulse™ RMD™, and CSC welding processes. Again, it is desirable to enable a relatively simple and low cost system 10 and, as such, the wave shape changes that are implemented by the controller 42 may include increasing the current after the welding wire electrode 28 has separated from the puddle 32 (and the plasma has been re-ignited). Doing so will help to form the next ball 34, help ensure that possible puddle oscillations do not re-attach to the welding wire electrode 28, and help increase the amount of welding wire electrode 28 that can be deposited as this is a "safe" place to add energy to the process without increasing the risk of an unstable process. In addition, the wave shape changes that are implemented by the controller 42 may include reducing the current as the welding wire electrode 28 is about to touch the puddle 32. Doing so will help reduce the chances of the welding wire electrode 28 burning away as its trying to touch the puddle 32, help reduce the chances of the welding wire electrode 28 and the molten ball 34 touching the puddle 32 and being "rejected" by a poorly timed pinch event. In addition, the wave shape changes that are implemented by the controller 42 may include reducing the current as the welding wire electrode 28 is about to separate from the molten puddle 32. Doing so will help reduce the force of the plasma as it re-ignites. Reducing this force (i.e., going from no plasma to plasma) reduces puddle agitation, reduces spatter, and helps make the process more stable.

In certain embodiments, if the arc has not re-established and the retraction is over or about to be over, the controller 42 may increase the current to force the pinching of the molten column between the puddle 32 and the welding wire electrode 28. In certain embodiments, if the welding wire electrode 28 gets buried into the puddle 32 and the controller 42 determines that no retraction of the mechanical oscillation system 102 will re-ignite the plasma, then a conventional pinch event may be required. In such an event, the controller 42 may adjust the wave shape to include a relatively high current event to liquefy the welding wire electrode 28 and/or pinch the liquid area of the welding wire electrode 28 and/or the puddle 32, and re-ignite the arc. In addition, in certain embodiments, if a pinch event would generate too much force for a relatively delicate 3D part, the controller 42 may stop the process and require manual resetting of the system 10.

Figure 8:
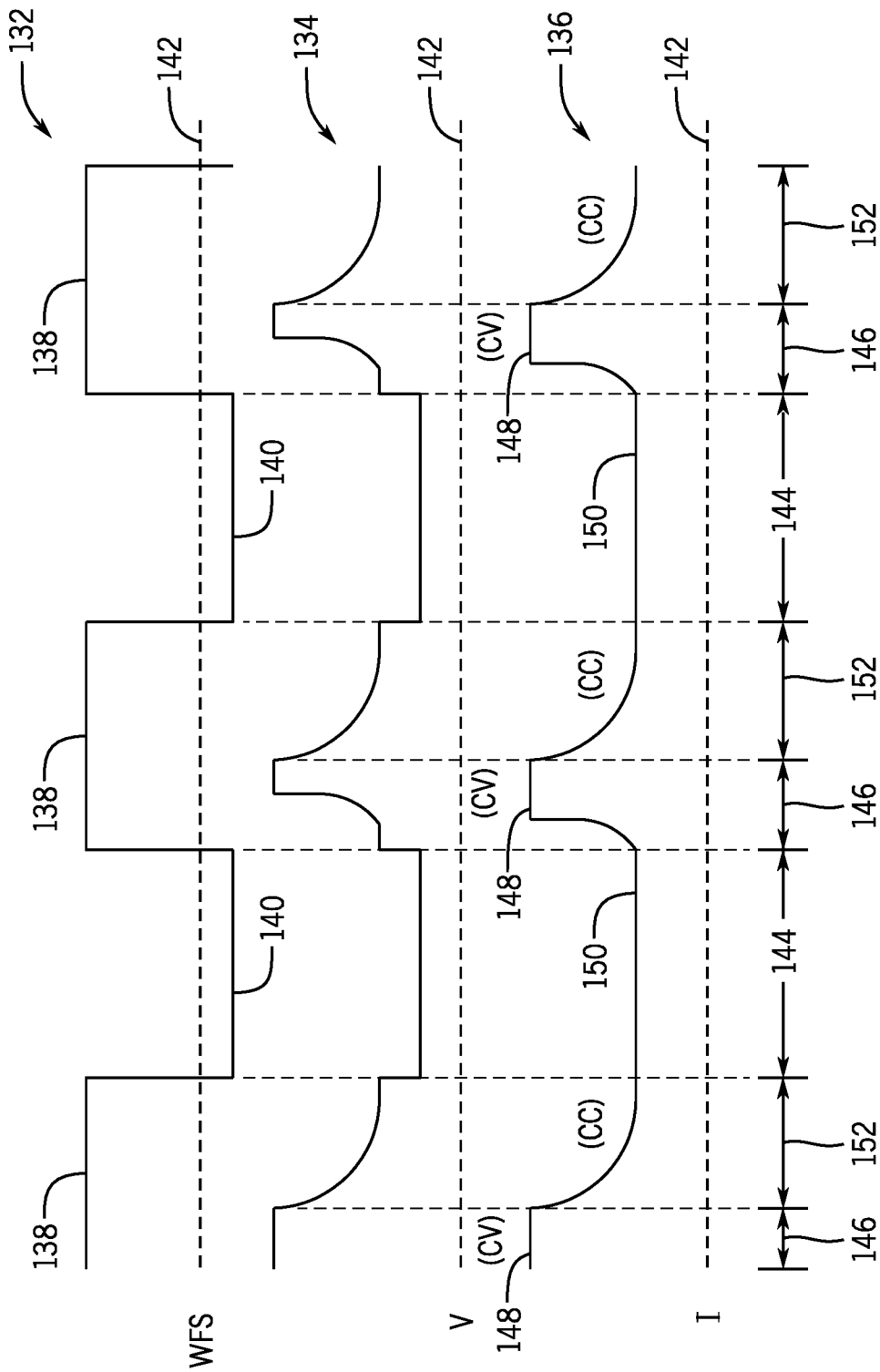
FIG. 8 illustrates time series of wire feed speed of a welding wire electrode caused by the mechanical oscillation system, voltage of electrical power generated by a power source, and current of the electrical power generated by the power source, in accordance with an exemplary controlled short circuit (CSS) wave shape implemented by a controller.

FIG. 8 illustrates time series of wire feed speed (WFS) of the welding wire electrode 28 caused by the mechanical oscillation system 102 (i.e., trace 132), voltage (V) of the electrical power generated by the power source 54 (i.e., trace 134), and current (I) of the electrical power generated by the power source 54 (i.e., trace 136), in accordance with an exemplary CSC wave shape implemented by the controller 42. As illustrated in FIG. 8, and as described in greater detail herein, the wire feed speed of the welding wire electrode 28 generally oscillates between a positive feed rate 138 and a negative feed rate 140 (i.e., during retraction), wherein the positive feed rate 138 has a magnitude that is greater than the negative feed rate 140 such that the welding wire electrode 28 is advanced over time, as illustrated in FIG. 5. The axes 142 for each trace 132, 134, 136 are intended to represent zero values for each respective parameter, i.e., wire feed speed, voltage, and current. FIG. 8 shows that the positive wire feed speed area (e.g., corresponding to the positive feed rate 138) is higher above the axis 142 than the negative wire feed speed area (e.g., corresponding to the negative feed rate 140) is below the axis 142. Again, this is to show that the total wire feed speed is a combination of the constant forward wire feed speed plus the oscillations caused by the mechanical oscillation system 102.

As illustrated in FIG. 8, the current is held relatively low during a short (e.g., intervals 144). After the short clears (e.g., intervals 146), the current is increased for a short time (e.g., between 0.5-5.0 milliseconds, in certain embodiments) to form a ball 34. In certain embodiments, this arc phase may have a constant voltage (CV) characteristic, which has an added advantage of increasing or decreasing the current of the ball-forming peak 148 such that larger or smaller balls 34 are formed depending on how close the welding wire electrode 28 is to the puddle 32 (e.g., the arc length). This will tend to help balance the burn-off rate with the average forward wire feeding rate. The CV characteristic may be achieved with the duration of time of the ball forming pulse or its amplitude.

Then, after the ball 34 is formed, the current may be reduced to a relatively low level 150 (e.g., intervals 152). In certain embodiments, this may have a constant current (CC) characteristic. However, in other embodiments, a CV characteristic at a relatively low voltage level may be implemented, which may tend to help match the incoming average wire feed rate with the burn-off rate. Ideally, this relatively low current 150 would be such that there is minimal force from the plasma between the ball 34 and the puddle 32 as the welding wire electrode 28 gets close to the puddle 32, and such that there is minimal spatter created or ball rejection when the ball 34 touches the puddle 32. The current will be held relatively low waiting for the welding wire electrode 28 to be retracted from the puddle 32 by the mechanical oscillation system 102, leaving the ball 34 in the puddle 32. In certain embodiments, a pulse of current during the short (e.g., intervals 144) may be implemented, which may tend to increase resistive heating of the welding wire electrode 28, but which may also produce spatter if the short clears while still at the relatively high current level (e.g., peaks 148). In certain embodiments, the amplitude of this pulse current may be influenced by a constant voltage (CV) control loop, whose amplitude or time may be limited by the controller 42 to ensure the current is not at a relatively high level when the short clears.

Figure 9:
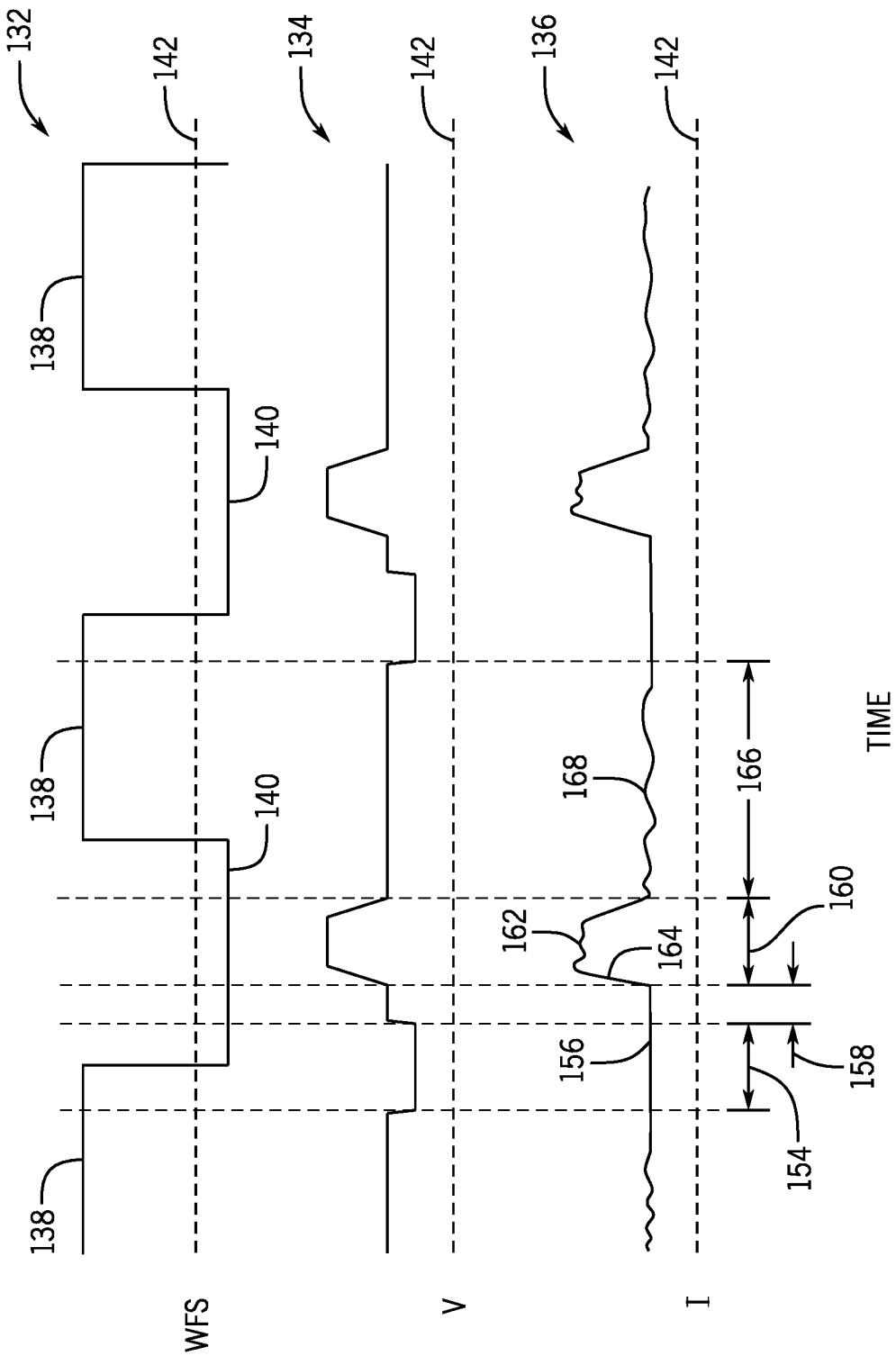
FIG. 9 illustrates another set of time series of wire feed speed of the welding wire electrode caused by the mechanical oscillation system, voltage of electrical power generated by the power source, and current of the electrical power generated by the power source, in accordance with another exemplary CSC wave shape implemented by the controller.

It should be noted that the constant voltage (CV) states tend to give a certain amount of dynamic power to help the system 10 match the melt rate with the average wire feed speed. This dynamic melting improves the robustness of the process. In contrast, a process where the power is entirely constant current (CC) is relatively more difficult to match to a fixed wire feed speed. FIG. 9 illustrates another set of time series of wire feed speed (WFS) of the welding wire electrode 28 caused by the mechanical oscillation system 102 (i.e., trace 132), voltage (V) of the electrical power generated by the power source 54 (i.e., trace 134), and current (I) of the electrical power generated by the power source 54 (i.e., trace 136), in accordance with another exemplary CSC wave shape implemented by the controller 42. In particular, FIG. 9 illustrates one oscillation of the welding wire electrode 28 (e.g., one cycle of the positive feed rate 138 and the negative feed rate 140) for each ball transfer. It is entirely possible to have multiple oscillations of the welding wire electrode 28 for one ball transfer. In particular, if the ball 34 formation pulse melts enough of the welding wire electrode 28, then it may take a couple of oscillation cycles of the mechanical oscillation system 102 before the welding wire electrode 28 has advanced far enough to make contact with the puddle 32 again. In general, the primary function of the mechanical oscillation system 102 is to pull the welding wire electrode 28 out of the puddle 32, while leaving the ball 34 behind.

Returning to FIG. 9, during a short circuit state (e.g., interval 154), as the welding wire electrode 28 is being advanced at the positive feed rate 138, the voltage may be detected. For example, in certain embodiments, the sensors 72 described herein may include voltage-sensing circuitry that detects the voltage, and communicates the detected voltage to the controller 42 (e.g., such that the controller 42 can determine that the short circuit state 154 has been initiated, for example, by detecting a substantial decrease in the voltage). For reference, in GMAW welding, a short circuit phase will generally have a voltage of 10-15 volts lower than an arc phase. That is, it takes about 10 volts to ionize the welding gas to create the arc. During the short circuit state 154, the current is held at a relatively low constant current (CC) level 156 (e.g., less than 50 amps, or between 5-30 amps, in certain embodiments) so as to not cause much spatter or puddle agitation when the short clears. In certain embodiments, once the short circuit state 154 is established, in addition to synchronizing the welding power to the mechanical oscillation, the controller 42 may also send a command to the mechanical oscillation system 102 to retract the welding wire electrode 28 at the negative feed rate 140. In certain embodiments, an index sensor could be used to provide explicit feedback to the controller 42 of the position of the welding wire electrode 28 (i.e., whether the welding wire electrode 28 is in a retracted or advanced position). In certain embodiments, the sensors 72 may be used by the controller 42 to determine when the short circuit state 154 has ended, for example, by detecting the voltage, thereby allowing the controller 42 to determine that the short circuit has cleared based on a substantial increase in the voltage.

Subsequently, during an arc re-establish state (e.g., interval 158), which occurs directly after the short circuit state 154, the controller 42 holds the current at the relatively low constant current (CC) level 156 for a short period of time (e.g., between 100-300 milliseconds, between 150-250 milliseconds, or approximately 200 milliseconds, in certain embodiments) such that the arc may be re-established with a relatively low current while the welding wire electrode 28 is being retracted.

Once the arc is re-established, and while the welding wire electrode 28 continues to be retracted, during a ball formation state (e.g., interval 160), which occurs directly after the arc re-establish state 158, the controller 42 increases the current to a relatively higher current level 162 to burn the welding wire electrode 28 back away from the puddle 32 and to form the next ball 34. As illustrated, in certain embodiments, a constant current (CC) ramp 164 may be implemented by the controller 42 to drive the relatively quick jump in current. In certain embodiments, the degree of the CC ramp 164 (i.e., the rate of increase of the current from the relatively low constant current level 156 to the peak current level 162) may be determined by the controller 42 based at least in part on the size (e.g., diameter) or particular alloy of the welding wire electrode 28 and/or the average wire feed speed. Once the peak current level 162 is reached, the controller 42 may implement a constant voltage (CV) control loop on the current to give the process additional robustness. In certain embodiments, the peak current level 162 may be limited by the controller 42 so as to avoid transitioning into a spray mode. In certain embodiments, the peak current level 162 may be less than 250 amps, less than 200 amps, or even less (e.g., between 150-200 amps, in certain embodiments). In addition, the peak current level 162 is limited by the controller 42 to minimize the force that the plasma has on the puddle 32 (i.e., to limit the penetration and puddle agitation).

After a fixed amount of time in the ball formation state 160 (e.g., less than 5 milliseconds, less than 2 milliseconds, less than 1 millisecond, or even less, in certain embodiments), and while the welding wire electrode 28 continues to be retracted, during a background state (e.g., interval 166), which occurs directly after the ball formation state 160, the controller 42 decreases the current down from the peak current level 162 to a relatively low current level 168 to begin the background state 166. Once the relatively low background current level 168 is reached, the controller 42 may switch to a constant voltage (CV) control loop for improved process robustness. In certain embodiments, the background current level 168 may be limited to less than 50 amps, or between 5-30 amps, so that the plasma does not push the puddle 32 away too much from the next short, so as to not make a ball 34 that is too big, and to not put too much heat into the puddle 32. In certain embodiments, once the relatively low background current level 168 is reached, in addition to synchronizing the welding power to the mechanical oscillation, the controller 42 may also send a command to the mechanical oscillation system 102 to begin advancing the welding wire electrode 28 at the positive feed rate 138 again. Once the background state 166 is completed, the cycle will repeat again (i.e., with the next short circuit state 154).

The CSC process implemented by the controller 42, as illustrated in FIG. 9, may include several alternative features in certain embodiments. For example, in certain embodiments, all of the states 154, 158, 160, 166 of the CSC process illustrated in FIG. 9 may be either constant current (CC) or constant voltage (CV). For example, all of the states 154, 158, 160, 166 could be CC, but the process would not be quite as robust. Alternatively, just one of the states 154, 158, 160, 166 could be CV to give some amount of dynamic melting to help the system 10 match the melt rate with the average wire feed speed. In addition, in certain embodiments, the controller 42 may use a running average voltage to approximate arc length, and then drive the duration of the ball formation state 160 based at least in part on the running average voltage. In other words, if the arc length is determined by the controller 42 to be shorter than desired (e.g., indicating the burn-off is not keeping up with the wire feed speed), then the controller 42 could change the duration of the ball formation state 160 to melt more incoming welding wire electrode 28 to generate a bigger ball 34 for the next ball deposit and/or increase the frequency of oscillation to deposit more balls 34 per unit time. In addition, in certain embodiments, the controller 42 may implement mostly CC power, and change the speed of the incoming welding wire electrode 28. In other words, if the average voltage is determined by the controller 42 to be too low (e.g., indicating a relatively low average arc length), then the controller 42 could reduce the wire feed speed from the feeder 24 to increase the arc length. Doing so would tend to match the feed rate with the melting rate. However, since the dynamic control of the motor 110 of the mechanical oscillation system 102 is typically slower than electrical control loops, adjusting the wire feed speed in this manner may not enable as accurate control.

In addition, in certain embodiments, the controller 42 may implement a conventional CV control loop, but with certain limits imposed. FIG. 10 illustrates another set of time series of wire feed speed (WFS) of the welding wire electrode 28 caused by the mechanical oscillation system 102 (i.e., trace 132), voltage (V) of the electrical power generated by the power source 54 (i.e., trace 134), and current (I) of the electrical power generated by the power source 54 (i.e., trace 136), in accordance with another exemplary CSC wave shape implemented by the controller 42, wherein a conventional CV control loop is used with certain limits. Specifically, as illustrated in FIG. 10, the controller 42 may allow the CV process to run "normally" (i.e., in a conventional manner), but limit the current during the short circuit state 154 to a lower current level 170 (approximately 10-100 amps) than the background current level 168 (approximately 30-150 amps), and possibly also limit the peak current level 162 (approximately 100-300 amps). As illustrated in FIG. 10, in certain embodiments, as opposed to the CC ramp 164 discussed above with respect to FIG. 9, a constant voltage (CV) ramp 172 may be implemented by the controller 42 to drive the current from the relatively lower short circuit current level 170 to the peak current level 162 in a smoother, more asymptotic manner than the CC ramp 164. In practice, the integral component of a conventional PID control loop will be "pumped up" after being held low during a short. As such, it will naturally rise once it is allowed to do so at the end of the short. After the ball 34 is formed, the voltage control loop will be satisfied, and the error will go down, as will the current. In general, a CV control loop is a simple way to achieve a robust design with minimal effort.

As described herein, a recognized drawback of the relatively fixed retraction/advance and the relatively fixed frequency of the mechanical oscillation system 102 is that it may be relatively difficult to synchronize with the puddle 32 and actual detachment of the ball 34. Therefore, with this in mind, the embodiments of the controller 42 described herein control the electrical power generating the plasma and melting the welding wire electrode 28 to compensate for the lack of sophistication of the mechanical oscillation system 102. In general, the electrical power (e.g., welding power) is a slave to the mechanical process performed by the mechanical oscillation system 102. The simplest solution would be to use a conventional constant current (CC) welding power source (e.g., as the power source 54). In other words, if the retract distance is enough, the welding current can be set to, and stay at, a relatively fixed level. This relatively fixed current level would have to be high enough to melt the welding wire electrode 28 one ball 34 at a time. The relatively fixed current level would be relatively low such that it does not cause much puddle agitation or eject molten material from the puddle 32 or off the end of the welding wire electrode 28 (i.e., commonly referred to as spatter). However, in such embodiments, the CC melt rate would have to match the wire feed speed. In such embodiments, a slight "droop" in the CC response of the welding power source (e.g., the power source 54) and/or a voltage-sensing feeder (e.g., the feeder 24) would make this CC method more robust insofar as droop in a CC control loop means a slight reduction in the current as the voltage increases.

In certain embodiments, the process may be improved with simple dynamic changes to the welding current, as illustrated in FIGS. 8-10. With a goal of a relatively simple and low cost system 10, the wave shape changes implemented by the controller 42, as illustrated in FIGS. 8-10, are relatively minimal. For example, increasing the current after the welding wire electrode 28 has separated from the puddle 32 will help to form the next ball 34, help ensure that possible puddle oscillations do not re-attach to the welding wire electrode 28, and help increase the amount of the welding wire electrode 28 that can be deposited, as this is a "safe" place to add energy to the process without increasing the risk of any instabilities. In addition, reducing the current as the welding wire electrode 28 is about to touch the puddle 32 will help reduce the chances of the welding wire electrode 28 burning away as it is trying to touch the puddle 32, and will help reduce the chances of the welding wire electrode 28 and the molten ball 34 touching the puddle 32 and being "rejected". In addition, reducing the current as the welding wire electrode 28 is about to separate from the molten puddle 32 will help reduce the force of the plasma as it re-ignites (i.e., during the arc re-establish state 158). Reducing this force (e.g., going from no plasma to plasma) reduces puddle agitation, and helps make the process more stable. In general, if the arc has not re-established, and the retraction of the welding wire electrode 28 is over or about to be over, the current must be increased by the controller 42 to force the pinching of the molten column between the puddle 32 and the welding wire electrode 28. In certain embodiments, the current could be increased by the controller 42 during the short circuit state 154 to gain some resistive heating of the welding wire electrode 28. Doing so would help put heat into the welding wire electrode 28 without also putting more heat into the puddle 32, thereby reducing the need for time spent in the plasma, and thus reducing the heat into the puddle 32, which may be advantageous for building up of a small part, for example.

Again, in certain embodiments, the current is held relatively low by the controller 42 during the short circuit state 154. After the short clears, the current may be increased by the controller 42 (e.g., during the ball formation state 160) for a relatively short time (e.g., less than 40 milliseconds, less than 5 milliseconds, less than 1 millisecond, or even less, in certain embodiments) to form the ball 34. In certain embodiments, the ball formation state 160 would include a constant voltage (CV) characteristic, thus having an added advantage of increasing or decreasing the ball forming peak current level 162 such that larger or smaller balls 34 are formed depending on how close the welding wire electrode 28 is to the puddle 32 (e.g., the arc length). The CV characteristic will tend to help balance the burn-off rate with the average forward wire feeding rate. In certain embodiments, the CV characteristic could be achieved by the controller 42 by adjusting the duration of time of the ball formation state 160 or its amplitude.

Then, after the ball 34 is formed, the current may be reduced by the controller 42 to a relatively low background current level 168. In the embodiment illustrated in FIG. 8, this current reduction would have a constant current (CC) characteristic. However, in the embodiments illustrated in FIGS. 9 and 10, this current reduction would have a constant voltage (CV) characteristic, which would tend to help match the incoming average wire feed rate with the burn-off rate. In general, the relatively low background current level 168 would be held low enough by the controller 42 such that there is minimal force from the plasma onto the puddle 32 as the welding wire electrode 28 gets close to the puddle 32, and that there is minimal spatter created when the ball 34 touches the puddle 32. In addition, the relatively low background current level 168 would be maintained as the controller 42 waits for the welding wire electrode 28 to be retracted from the puddle 32, leaving the ball 34 in the puddle 32.

In certain embodiments, the controller 42 may cause a pulse of current during the short circuit state 154, which would tend to increase the resistive heating of the welding wire electrode 28, but may also produce more spatter if the short clears while still at the relatively higher pulsed current level. In certain embodiments, a "safety net" short clearing state may be implemented by the controller 42 to handle situations when the welding wire electrode 28 is not retracted enough from the puddle 32 (e.g., when the short circuit state 154 has a duration that is longer than one or two full mechanical oscillation cycles of the welding wire electrode 28 caused by the mechanical oscillation system 102). Such a short clearing state may include stopping the process altogether, or implementing a relatively high current short clearing pulse of energy.

In the interest of describing the operation of the system 10 described herein, a specific example will be presented. In particular, assuming that the welding wire electrode 28 has a positive net total wire feed speed (i.e., including both the forward feeding and the retraction) of 120 inches per minute, or 2 inches per second, which is relatively slow for wire feed rates, and that the mechanical oscillation system 102 oscillates the welding wire electrode 28 at a substantially fixed rate of 60 oscillations per second, then the welding wire electrode 28 vibrates up/down 60 times for every 2 inches traversed. As such, in general, the welding wire electrode 28 should burn off 60 molten metal balls 34 for every 2 inches traversed. Accordingly, the welding wire electrode 28 is advanced such that each ball 34 will consume about $2/60$ (i.e., approximately 0.0333) of an inch of the welding wire electrode 28.

In addition, if the mechanical oscillation system 102 causes the welding wire electrode 28 to oscillate at a substantially fixed rate of 60 oscillations per second, and if a duration of each phase of forward motion of the welding wire electrode 28 is approximately equal to a duration of each phase of retraction of the welding wire electrode 28, then the durations of the phases of forward motion and retraction of the wire electrode 28 are equal to approximately $1/120$ seconds (i.e., approximately 8.333 milliseconds). At a rate of 2 inches per second of steady forward advancement of the welding wire electrode 28 from the feeder 24, the welding wire electrode 28 moves approximately 0.01667 inches (i.e., 2 inches/second×0.008333 second) of welding wire electrode 28 while the welding wire electrode 28 is retracting. In general, the welding wire electrode 28 must retract approximately 0.01667 inches plus the distance needed to break the liquid bridge (for example, the diameter of a single ball 34 may be estimated to be approximately 0.05 inch). Therefore, the total retract distance of the welding wire electrode 28 must be a minimum of approximately 0.05+0.01667=approximately 0.06667 inches. In general, reducing the amount of time the retraction takes reduces the amount of welding wire electrode 28 that will be advanced while retraction occurs.

When the plasma re-ignites, it will melt the welding wire electrode 28, increasing the distance that the molten ball 34 must be moved forward to reconnect with the puddle 32. Assuming that a new ball 34 has formed, and approximately 0.0333 inches of the welding wire electrode 28 has been melted to form a 0.05 inch diameter ball 34, by moving more than 0.1 inch forward or retracting, the molten ball 34 will be nearly guaranteed to reconnect with or separate from the puddle 32. In this scenario, this distance is twice the diameter of the ball 34, and is a relatively small distance to travel.

A diameter of the ball 34 that is slightly larger than the diameter of the welding wire electrode 28 is common for other welding processes as well. In general, the velocity of the retraction should be significantly faster than the velocity of the forward motion of advancement. In addition, the relatively fixed travel distance of the retraction should be enough to pull the welding wire electrode 28 out of the molten puddle 32. In addition, the surface tension will tend to cause the molten metal from the puddle 32 to "stick" to the welding wire electrode 28, so the travel distance of the retraction should be enough to overcome this surface tension.

In general, electrical current flowing through a liquid conductor will cause the liquid conductor to constrict. This is called the "pinch effect". With conventional MIG welding processes, relatively high peak currents are used to separate the wire from the liquid puddle. However, this relatively high current then also re-ignites the plasma with a relatively strong force that agitates the molten puddle, and adds a certain amount of volatility to the process. Ideally, the plasma is re-ignited at a relatively low current such that little agitation occurs.

In the embodiments described herein, by retracting the welding wire electrode 28, the welding wire electrode 28 will separate from the puddle 32. If the welding wire electrode 28 does not completely separate, more electrical current can be added to drive an electrical pinch. Since the retraction likely narrows the liquid column, the current required would still be less than without the retraction. With a relatively small diameter wire, the liquid ball 34 (and subsequent liquid column between the end of the welding wire electrode 28 and the puddle 32) will have a smaller diameter, and shorter retraction can be used. Speed is not necessarily a critical performance requirement for a low cost system 10. In addition, a smaller diameter welding wire electrode 28 will produce a smaller ball and a narrower puddle 32, which will provide greater resolution for the finished part. In general, speed of producing the part may be sacrificed for resolution, accuracy, and reduced penetration.

Certain alternatives may be used for the system 10 described herein. For example, instead of using the CSC processes described herein, in certain embodiments, MIG welding processes may be implemented by the controller 42 and the power source 54. In such embodiments, the mechanical retraction caused by the mechanical oscillation system 102 ensures better starts and fewer problems. Furthermore, in other embodiments, RMD welding processes may also be implemented by the controller 42 and the power source 54. In such embodiments, the RMD process may be optimized by the controller 42 for the particular application. In addition, in other embodiments, a modified submerged-arc welding (SAW) process may be implemented by the controller 42 and the power source 54. In such embodiments, the flux would allow for different metallurgical characteristics in the finished parts. In all embodiments described herein, different alloys of the welding wire electrode 28 may be used, especially cored wires, to achieve unique metallurgical characteristics in the finished parts.

In general, the embodiments described herein are intended to enhance the detachment of the ball 34 via the relatively low cost mechanical oscillation system 102. In certain embodiments, the mechanical oscillation system 102 may send a shock wave down the welding wire electrode 28 like a pneumatic drill. Such vibration in the liquid column may make the liquid column begin to constrict. Once the constriction starts, if there is adequate current, the pinch effect will take over.

In certain embodiments, an additive welding process to form a 3D part would put one weld bead on top of previous weld beads to form a part. If the base is fused to the first weld bead, then a base must be used. In such embodiments, a conductive and chilled plate, such as a water-cooled copper block, may be used. Such a block would not fuse with the weld bead. This would allow more flexibility in forming the part, particularly the first layer and the bottom layer.

Again, the embodiments described herein enable a relatively low cost system 10 that includes a mechanical oscillation system 102 that has a relatively fixed travel distance and a relatively limited oscillation frequency range for oscillating the welding wire electrode 28 between forward motion and retraction. The relative lack of sophistication of the mechanical oscillation system 102, which helps reduce the cost of the system 10, is compensated for by the controller 42 implementing the CSC processes described herein via the power source 54.

The embodiments described herein may also facilitate better arc starts. Arc starting has been a perennial problem in arc welding using consumable electrodes, and its economics are amplified in short stitch welding, such as in automotive seats. Typically, the wire is fed at a slow feed rate (called run-in speed) until a short circuit occurs. Thereafter, a surge of current is output from the welding power source to ignite the arc or blow away the short circuit like a fuse, hopefully resulting in arc ignition. However, depending on the condition of the initial contact between wire and the workpiece, the fuse explosion and arc ignition may not be peaceful. If the contact resistance is low, for example when the wire end is not sharp, the wire stubs out and the entire wire extended from the contact tip may be broken off like a flying baton, or the wire may just heat up and bend like a noodle. Remedies for better arc start do exist to have graceful arc ignition but also carries penalties. For example, slower run-in speed wastes robot cycle time; wire retract start requires expensive motorized torch, and wire sharpening pulse at arc end may yield crater defect.

The system 10 described herein may be used to facilitate initial wire-to-workpiece contact (or "scratch starting") due at least in part to the oscillation of the welding wire electrode 28 that generated by the mechanical oscillation system 102. In general, the oscillation of the welding wire electrode 28 may be manipulated such that slight contact is created between the welding wire electrode 28 and the workpieces 16, 18, thereby increasing the contact resistance R and magnifying the $I^2R$ (i.e., current (I) squared times resistance (R)) heating of the tip of the welding wire electrode 28 that contacts the workpieces 16, 18. With the increased resistance R, the same current I may produce an increased heating effect to ignite the arc.

FIG. 11 is a flow chart that depicts an arc starting process 174 that may be implemented by the system 10 described herein in certain embodiments. The arc starting process 174 may begin when an arc start command (e.g., the trigger 80 of the welding torch 20 being pulled by an operator in manual welding, or a robot cycle start button being pushed in robotic welding, for example) has been received by the controller 42 (block 176). Once the arc start command has been received by the controller 42, the controller 42 may send a command to the mechanical oscillation system 102 to start the oscillation of the welding wire electrode 28 (block 178). In addition, the controller 42 may send a command to the feeder 24 to begin feeding of the welding wire electrode 28 to the welding torch 20 (block 180). Then, the one or more sensors 72 may be used to sense whether an arc between the welding wire electrode 28 and the workpieces 16, 18 has been established (block 182). For example, in certain embodiments, the sensors 72 may include voltage-sensing circuitry and/or current-sensing circuitry, which may be used to detect when the voltage and/or current cross a predetermined threshold, such as 14 volts, for example. Upon determination that the arc establishment condition has occurred, the controller 42 may send a command to the mechanical oscillation system 102 to stop the oscillation of the welding wire electrode 28 (block 184), which will reduce the duty cycle requirement on the motor 110 of the mechanical oscillation system 102, thereby reducing the cost and weight requirement of the mechanical oscillation system 102. Then, the controller 42 may send a command to the feeder 24 to ramp the speed of the feeding of the welding wire electrode 28 up to a desired welding wire feed speed (block 186), which may be set via the operator interface 78.

The arc starting process 174 described with reference to FIG. 11, which may be implemented by the system 10 described herein, may provide several advantages over conventional arc starting methods. For example, the arc starting process 174 provides more reliable arc starts than conventional arc starting methods, thereby causing less downtime and producing lower amounts of spatter. These two advantages are very important in applications with short welds and many arc starts. In addition, the arc starting process 174 costs relatively less than conventional arc starting methods, due at least in part to the implementation of the relatively low cost mechanical oscillation system 102. In addition, the arc starting process 174 reduces cycle time in instances where the run-in speed may be increased while still producing reliable arc starts. In addition, the arc starting process 174 reduces electromagnetic interference (EMI) and electromagnetic fields (EMF) in instances where relatively lower arc currents are required while still producing reliable arc starts. In addition, the arc starting process 174 increases contact tip life because of less electrical erosion that may otherwise result from relatively lower arc current surges while establishing the arc. In addition, the arc starting process 174 described with reference to FIG. 11, which may be implemented by the system 10 described herein, may provide advantages relating to arc starting in several applications including, but not limited to, gas metal arc welding (GMAW), including MIG welding; SAW; wire brazing; weld overlaying, including cladding and/or hardfacing; multiple-wire GMAW/SAW; GMAW-laser hybrid welding; and so forth.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

What is claimed is:
1. A system comprising:
an additive manufacturing tool configured to receive a wire from a wire drive assembly of a wire feeder, to receive current from a power source, and to supply the wire to a workpiece during an additive manufacturing process; and
a mechanical oscillation system configured to mechanically oscillate a structural component toward and away from the workpiece, wherein the structural component is external to the wire feeder and the power source.

2. The system of claim 1, wherein the structural component is at least partially disposed within the additive manufacturing tool.

3. The system of claim 1, wherein the additive manufacturing tool comprises the mechanical oscillation system and the structural component.

4. The system of claim 1, wherein the additive manufacturing tool is a handheld additive manufacturing tool.

5. The system of claim 1, wherein the additive manufacturing tool is a robotic additive manufacturing tool.

6. The system of claim 1, wherein the structural component comprises a liner.

7. The system of claim 1, wherein the welding wire extends through the structural component.

8. The system of claim 1, wherein mechanical oscillation of the structural component has a substantially fixed travel distance.

9. The system of claim 1, wherein mechanical oscillation of the structural component has a substantially fixed frequency.

10. The system of claim 1, wherein the mechanical oscillation system comprises a motor and a mechanical linkage assembly coupled to the motor, wherein the mechanical linkage assembly is fixedly attached to the structural component.

11. The system of claim 10, wherein the additive manufacturing tool comprises a liner extending into the structural component, the wire extends through the liner, and the structural component is directly coupled to the liner.

12. The system of claim 10, wherein the mechanical linkage assembly comprises a cam coupled to the motor, and a piston coupled to the cam, wherein the piston is fixedly attached to the structural component.

13. A system comprising:
an additive manufacturing tool configured to receive a wire from a wire drive assembly of a wire feeder, to receive current from a power source, and to supply the wire to a workpiece during an additive manufacturing process;
a mechanical oscillation system configured to mechanically oscillate a structural component toward and away from the workpiece, wherein the structural component is external to the wire feeder and the power source; and
control circuitry configured to control the current based on feedback relating to the additive manufacturing process.

14. The system of claim 13, wherein the control circuitry is configured to control the current based at least in part on feedback relating to timing of a short circuit that occurs between the wire and the workpiece during the additive manufacturing process.

15. The system of claim 14, wherein the control circuitry is configured to determine when the short circuit occurs based at least in part on feedback received from a sensor that detects a voltage level corresponding to the current.

16. The system of claim 14, wherein the control circuitry is configured to hold the current substantially constant for a time period of between 100-300 milliseconds after the short circuit ends before increasing the current.

17. The system of claim 14, wherein the control circuitry is configured to increase the current to a peak current level after the short circuit ends.

18. The system of claim 17, wherein the control circuitry is configured to increase the current to the peak current level using a current-controlled ramp.

19. The system of claim 17, wherein the control circuitry is configured to determine a rate of increase of the current to the peak current level based on at least one of a diameter of the wire or an average wire feed speed of the wire.

20. The system of claim 17, wherein the control circuitry is configured to increase the current to the peak current level in an asymptotic manner.

* * * * *